(12) United States Patent
Frankel

(10) Patent No.: US 7,584,086 B2
(45) Date of Patent: Sep. 1, 2009

(54) CHARACTERIZING CONNECTIVITY IN RESERVOIR MODELS USING PATHS OF LEAST RESISTANCE

(75) Inventor: David S. Frankel, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 563 days.

(21) Appl. No.: 10/568,940

(22) PCT Filed: Sep. 29, 2004

(86) PCT No.: PCT/US2004/032942

§ 371 (c)(1),
(2), (4) Date: Feb. 21, 2006

(87) PCT Pub. No.: WO2005/033739

PCT Pub. Date: Apr. 14, 2005

(65) Prior Publication Data

US 2007/0027666 A1 Feb. 1, 2007

Related U.S. Application Data

(60) Provisional application No. 60/507,332, filed on Sep. 29, 2004.

(51) Int. Cl.
*G06F 7/60* (2006.01)
*G06F 17/10* (2006.01)
(52) U.S. Cl. ............................................. 703/10; 703/2
(58) Field of Classification Search ..................... 703/2, 703/10
See application file for complete search history.

(56) References Cited

U.S. PATENT DOCUMENTS

| 5,732,192 | A | 3/1998 | Malin et al. |
| 5,757,663 | A | 5/1998 | Lo et al. |
| 6,106,561 | A | * | 8/2000 | Farmer ........................ 703/10 |
| 6,477,515 | B1 | 11/2002 | Boroujerdi et al. ............ 706/14 |
| 6,549,879 | B1 | 4/2003 | Cullick et al. ................. 703/10 |
| 6,862,531 | B2 | 3/2005 | Gaiser et al. ................. 702/14 |
| 2002/0050993 | A1 | 5/2002 | Kennon et al. ............... 345/423 |

(Continued)

FOREIGN PATENT DOCUMENTS

WO  WO 00/32905  6/2000

(Continued)

OTHER PUBLICATIONS

Kevin Wayne, "Greed:shortest path" Princeton University, Spring 2002, pp. 1-10.*

(Continued)

*Primary Examiner*—Paul L Rodriguez
*Assistant Examiner*—Dwin M Craig
(74) *Attorney, Agent, or Firm*—ExxonMobile Upstream Research Company-Law Department

(57) ABSTRACT

The invention relates to numerical simulation of subsurface geological reservoirs. More specifically embodiments of the invention are related to computer modeling of the transmission of properties, for example the flow of fluids (e.g. hydrocarbon natural resources and water), within subsurface geological reservoirs. One embodiment of the invention includes a method of evaluating the transmission of a property within a subsurface geologic reservoir using a graph-theory single source shortest path algorithm.

32 Claims, 17 Drawing Sheets

U.S. PATENT DOCUMENTS

| | | |
|---|---|---|
| 2002/0169785 A1 | 11/2002 | Netemeyer et al. .......... 707/103 |
| 2003/0028325 A1 | 2/2003 | Roggero et al. ............... 702/11 |
| 2003/0035417 A1 | 2/2003 | Zirojevic et al. ............ 370/357 |

FOREIGN PATENT DOCUMENTS

| | | |
|---|---|---|
| WO | WO 00/58910 | 10/2000 |
| WO | WO 01/27858 | 4/2001 |
| WO | WO 01/40937 | 6/2001 |
| WO | WO 02/57901 | 7/2002 |

OTHER PUBLICATIONS

L. M. Hirsch, J. F. Schuette, "Graph Theory Applications to Continuity and Ranking in Geologic Models", Computers & Geosciences, No. 25, 1999, pp. 127-139.

J. K. Williams, A. J. Pearce, G. W. Geehan, "Modelling Complex Channel Environments: Assessing Connectivity and Recovery", 7th European IOR Symposium, Moscow, Russia, Oct. 27-29, 1993, pp. 47-57.

"Algorithm for Random Selection of Shortest Path", IBM Technical Disclosure Bulletin, Armonk, New York, Nov. 1989, vol. 32 No. 6A, pp. 478-480.

S. K. Walley, H. H. Tan, A. M. Viterbi, "Shortest Path Cost Distribution in Random Graphs with Positive Integer Edge Costs", IEEE, 1993, pp. 1023-1032.

T. S. Li, D. Kato, Y. Ohtani, "A Probabilistic Approach for the Reliability Assessment of Offshore Structure Considering Corrosion and Fatigue", SPE 59435, Apr. 25-26, 2000, pp. 1-8.

K. P. Norrena, C. V. Deutsch, "Automatic Determination of Well Placement Subject to Geostatistical and Economic Constraints", SPE/CIM/CHOA 78996, Nov. 4-7, 2002, pp. 1-12.

O. B. Akinsanmi, L. E. Anwasi, M. A. Ogundana, "Application of Azimuthal Density While Drilling Images for Dips, Facies and Reservoir Characterisation—Niger/Delta Experience", SPE/CIM 65460, Nov. 6-8, 2000, pp. 1-14.

J. Tingas, R. Frimpong, "Integrated Reservoir and Surface Network Simulation in Reservoir Management of Southern North Sea Gas Reservoirs", SPE 50635, Oct. 20-22, 1998, pp. 51-62.

C. V. Deutsch, S. Srinivasan, "Improved Reservoir Management Through Ranking Stochastic Reservoir Models", SPE/DOE 35411, Apr. 21-24, 1996, pp. 105-113.

European Search Report No. 110558, dated Mar. 24, 2004, for U.S. Appl. No. 60/507,332, 4 pages.

PCT International Search Report and Written Opinion, mailed Feb. 3, 2006, for International Application No. PCT/US04/32942, 7 pages.

T. H. Cormen et al., *Introduction to Algorithms, Chapter 25: Single-Source Shortest Paths*, The MIT Press, Cambridge, MA, 1990, pp. 514-533.

E. W. Dijkstra, "A Note on Two Problems in Connexion with Graphs", Numerische Mathematik, Jun. 1, 1959, pp. 269-271.

PCT International Preliminary Report on Patentability for International Application No. PCT/US04/32942, Apr. 2006, 5 pages.

\* cited by examiner

CHARACTERIZING CONNECTIVITY IN RESERVOIR MODELS USING PATHS OF LEAST RESISTANCE

CROSS REFERENCE TO RELATED APPLICATIONS

This application is the National Stage of International Application No. PCT/US04/32942, filed 29 Sep. 2004, which claims the benefit of U.S. Provisional Application No. 60/507,332, filed 30 Sep. 2003.

FIELD OF THE INVENTION

The invention relates to numerical simulation of subsurface geological reservoirs. More specifically embodiments of the invention are related to computer modeling of the transmission of fluid (e.g., hydrocarbon natural resources and water) properties and/or reservoir properties within subsurface geological reservoirs.

BACKGROUND

Reservoir simulation is used in the oil and gas production industry to assess the most profitable means to locate and operate wells (boreholes) to produce subsurface accumulations of oil and gas to the surface, where the fluids can be transported, refined, and sold.

Reservoir simulation is of great interest because it infers the behavior of a real hydrocarbon-bearing reservoir from the performance of a mathematical or numerical model of that reservoir. The typical objective of reservoir simulation is to understand the complex chemical, physical, and fluid flow processes occurring in the reservoir sufficiently well to predict future behavior of the reservoir to maximize hydrocarbon recovery. Reservoir simulation calculations in such hydrocarbon systems are based on fluid flow through the reservoir being simulated. These calculations are performed with varying degrees of rigor, depending on the requirements of the particular simulation study and the capabilities of the simulation software being used.

Computer programs that use numerical simulation are used first to build a reservoir simulation model that characterizes rock and fluid properties and then to calculate the evolution of the system over time in response to planned well operations to remove saleable fluids and in some cases to replace these with less valuable fluids to maintain pressure.

The principle of numerical simulation is to numerically solve equations describing a physical phenomenon using a computer. Such equations are generally systems of ordinary differential equations and partial differential equations. As a means for numerically solving such equations, there are known the finite element method, the finite difference method, the finite volume method, and the like. Regardless of which method is used, the physical system to be modeled is divided into cells (a set of which is called a grid or mesh), and the state variables that vary in space throughout the model are represented by sets of values for each cell. A reservoir simulation grid may be built by subdividing (discretizing or gridding) the volume of interest into a large number of polyhedral cells. The number of cells commonly ranges from a few tens of thousands to several hundreds of thousands. The volume of interest is defined areally and vertically by the extent of the oil and gas accumulation and of the water that is in pressure communication with the oil and gas. The area may be several square miles, and the thickness may be hundreds or even thousands of feet. The reservoir rock properties such as porosity and permeability are typically assumed to be constant inside a cell. Other variables such as fluid pressure and phase saturation are specified at specified points, sometimes called nodes, within the cell. A link between two nodes is called a "connection." Fluid flow between two cells is typically modeled as flow along the connection between them.

The state of a simulation cell may be defined by its pressure and its contents, i.e., the amounts of oil, gas, and water within the cell. The goal of simulation is to calculate the evolution through time of the states of all cells. This evolution is governed by the initial states and by the time-dependent removal of fluid from (production) or addition of fluid to (injection) the system by way of wells.

The state of a cell changes in time because of fluid flow between pairs of neighboring cells or between a cell and a well. Fluid flows from high pressure to low pressure. Pressure gradients are induced by removing fluid from the reservoir (production) or adding fluid to the reservoir (injection) by way of wellbores that penetrate the porous and permeable rock. Within the reservoir, fluid converges on (flows toward) producing wellbores and diverges from (flows away from) injecting wellbores.

For purposes of modeling fluid flow, approximate versions of the relevant equations are written for each cell to express the conservation of mass and the relationship between phase flow rate and pressure gradient. The simultaneous (approximate) solution of these equations for the entire collection of cells yields the pressure and contents of each cell at a single time. The equations are solved for a sequence of times to characterize the evolution of the state of the reservoir.

The properties of cells and connections play a role in determining how the reservoir simulation model performs. These properties may be derived from a geologic reservoir characterization through processing techniques used in the art.

Conventional wisdom holds that the geologic modeling process yields a highly realistic portrayal of the spatial distribution of rock properties, and that converting such a geologic model to a reservoir simulation grid should naturally yield a realistic portrayal of connectivity. But there are factors that confound this favorable outcome. Because the geologic modeling process lacks tools to explicitly visualize connectivity, the geologic model may itself contain connectivity anomalies that escape detection using current technology.

Reservoirs are commonly segmented or compartmentalized by virtue of reduced permeability at fault surfaces and at stratigraphic sequence boundaries. These surfaces are often targeted for transmissibility adjustment and are just as often the source of inconsistent or erroneous adjustments that yield connectivity anomalies.

There are four current approaches to assessing connectivity in numerical simulation. The first method is finite difference simulation. In this approach, the user runs a finite-difference reservoir simulation program and interrogates the results. This approach is slow (hours to tens of hours) and only informs the user about parts of the model that are well connected to wells. Within finite difference simulation, there are three methods of interrogating results to assess connectivity.

The first finite difference method for assessing connectivity is to visualize pressure results. This is the most common style of visual interrogation. Changes in pressure are associated with the flow of fluid. A common observation is that pressure depletion is observed in compartments previously thought to be isolated from (i.e., poorly connected to) producing wells. In such cases, the pressure field appears diffuse and does not offer any guidance as to the path that connects the pressure-depleted compartment to a producing well.

The second finite difference method for assessing connectivity is to visualize tracer-to-component-ratio results. Reservoir simulation programs may offer the ability to associate named tracers with fluid components, e.g., water. By assigning different tracer:component ratios to resident fluids and injected fluids, the user can monitor the tracer:component ratio in the reservoir model over time to get some sense of where the injected fluid goes. Similarly to pressure results, tracer-ratio results are diffuse rather than specific. The fuzziness is exacerbated by the common situation that often only infrequent snapshots of tracer:component ratio results can be afforded. A low-frequency archive yields inadequately detailed information.

The third finite difference method for assessing connectivity is to visualize flows. Customized software tools, not available in standard software, make it possible to visualize statistics of internal flows. This method is still burdened by the need to actually conduct flow simulation and by the constraint of using actual wells. It works best for injector-producer pairs that are amenable to visualizing high flow rates.

The second approach to assessing connectivity in numerical simulation uses mental tomography. In this approach the user builds a mental image of the permeability field based on viewing numerous slices through the model, where each slice displays the value of permeability using color. This technique may have been adequate for the coarsely gridded, nearly homogeneous, structured simulation grids that were built 20 years ago, but it is impractical for complex, unstructured, modern models.

The third approach to assessing connectivity in numerical simulation uses streamline simulation. In this approach, the user runs a streamline flow simulation program and interrogates the results. This approach generally shows where fluid flows. However, it requires the a priori designation of source and/or sink wells, and it is slower than embodiments of the invention described herein to yield results.

The fourth approach to assessing connectivity in numerical simulation uses geobody visualization. Customized software tools, not available in standard software, make it possible to define and visualize geobodies with respect to user-defined criteria. In graph theory terminology, a geobody is a connected component, which means for all possible pairs of cells that belong to the geobody, a path (sequence of connections) exists to connect the pair.

User input for the "define geobodies" action consists of separate criteria for nodes and connections. The criteria are logical expressions (with a pass/fail outcome) that may range from simple to complex. The criteria are evaluated using node and connection properties. If a node fails the node criteria, the node is excluded from all geobodies, and the connections in which the failed node participates are treated as failed connections. If a connection fails the connection criteria, it is excluded from paths that may connect passing nodes. A node that participates in a failed connection is not marked as a failed node, because such a node may participate in other passing connections.

The results of a "define geobodies" action are that each node is assigned values for two properties: a geobody membership index that identifies which geobody (connected component) the node belongs to and a geobody score. The geobody score is an aggregate measure of the size or importance of the geobody, such as the number of nodes or total pore volume of the geobody. The geobody membership index is commonly an integer rank, assigned in order of descending score, i.e., the highest scoring geobody is 1, the next lower scoring geobody is 2, etc. A special membership-index value such as zero or −1 marks failed nodes that belong to no geobodies. Connectivity among the failed nodes is not assessed.

The ability of "define geobodies" to reveal information is sensitive to the node and connection criteria. Good (informative) criteria yield several high-scoring geobodies and many low-scoring geobodies. The user would normally use the 3D viewer to examine each high-scoring geobody, with special interest in its three-dimensional shape. Poor (uninformative) criteria yield either a single geobody or only low-scoring geobodies. Unfortunately, trial and error are required to find good criteria, and each trial is time-consuming.

Hirsch and Schuette propose applying graph theory algorithms to rank the anticipated flow performance of different geologic model realizations and to aid in delineating contiguous regions of similar character in petroleum reservoir flow simulations. ("Graph theory applications to continuity and ranking in geologic models", *Computers & Geosciences* 25, 127-139 (1999)). They report results from using three different types of graph theory algorithms in a test problem: maximum-flow, shortest-path and connected-components algorithms. Their discussion of the shortest-path method focuses on using the single-source, specific shortest path as the ranking measure, i.e., what is called the single-pair problem in the invention description to follow.

Current geologic modeling and reservoir simulation software applications lack the means to assess connectivity in a way that is fast, quantitative, and visual. Additionally, connectivity is defined poorly in existing methodologies. Connectivity may simply be determined in an yes/no methodology. A richer assessment of connectivity would identify the best path that connects Cell A with Cell B. Additional background can be found in Dijkstra, E. W., *A note on two problems in connection with graphs*, Numerische Mathematik, 1:269-271 (1959) and in Cormen, T. H. et al., *Introduction to Algorithms*, The MIT Press (1990).

SUMMARY

One embodiment of the invention includes a method of evaluating the transmission of a property within a subsurface geologic reservoir. The method may include providing a set of vertices representative of at least a portion of the reservoir and providing a plurality of edges representing property transmission paths between connected vertices within the set of vertices. The method may include associating with each edge a cost representative of the ability of a property to be transmitted across an edge from one vertex to another vertex within the set of vertices. The method may include selecting at least one source vertex from within the set of vertices and determining an extremum path between the source vertex and each of at least one and preferably at least two destination vertices that minimizes or maximizes the summed cost across the one or more edges included in the extremum path using a graph-theory single-source shortest-paths algorithm.

One embodiment of the invention includes a computer-readable media tangibly embodying a program of instructions executable by a computer to evaluate the transmission of a property within a subsurface geologic reservoir. The program may include the following steps.

a) reading a set of vertices representative of at least a portion of the reservoir;

b) reading a plurality of edges, the edges representing property transmission paths between connected vertices within the set of vertices;

c) associating with each edge a cost representative of the ability of a property to transmit across the edge from one vertex to another vertex within the set of vertices;

d) reading a first vertex from within said set of vertices; and e) determining an extremum path between the first vertex and each of at least one and preferably at least two other vertices that minimizes or maximizes the summed connection cost across the one or more edges included in the extremum path using a graph-theory single-source shortest-paths algorithm.

DETAILED DESCRIPTION

The present invention will be described in connection with its preferred embodiments. However, to the extent that the following description is specific to a particular embodiment or a particular use of the invention, this is intended to be illustrative only and is not to be construed as limiting the scope of the invention. On the contrary, it is intended to cover all alternatives, modifications, and equivalents that are included within the spirit and scope of the invention, as defined by the appended claims.

As used herein the term "extremum" means the maximum or minimum of some value or calculation. For example, the extremum path of a group of paths may be either a path that has the highest cost or a path that has the lowest cost. The plural of extremum is extrema.

Embodiments of the invention relate to reservoir simulation, including the numerical simulation of the transmission of fluid and/or reservoir properties within a geologic reservoir. Embodiments of the invention relate to numerical simulation of fluid flow in three dimensions (3D) of one, two, or three fluid phases in porous and permeable rock. The three fluid phases may be hydrocarbon liquid (oil), hydrocarbon vapor (gas), and an aqueous phase (water). Embodiments of the invention are also useful in simulating heat flow, chemical component transport and electrical current flow in a geologic reservoir.

Embodiments of the invention apply graph-theory data structure and graph-theory algorithms to identify lowest-cost paths between any two locations in the model. In some embodiments of the invention these paths and any model properties on these paths can be visualized using a modeling software's 3D viewer. Numerical analysis of the paths can yield additional valuable information.

Figure 1:
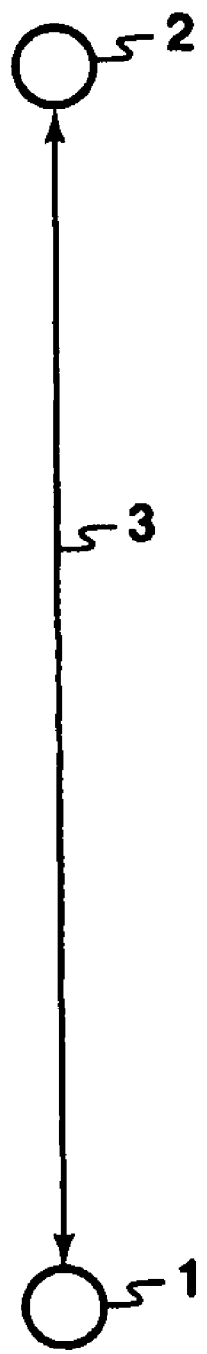
FIG. 1 is a graphical depiction of a simple set of two vertices and one edge.

In graph-theory mathematics, a graph is a collection of points and lines connecting some subset of the points. The points of a graph are most commonly known as graph vertices, but may also be called "nodes" or simply "points." Similarly, the lines connecting the vertices of a graph are most commonly known as graph edges, but may also be called "arcs" or "lines." Referring now to FIG. 1, depicting a first vertex 1 and a second vertex 2. The vertices in FIG. 1 are connected by edge 3. The arrows on the ends of the edge 3 depict an edge that is capable of transmission from first vertex 1 to second vertex 2 or from second vertex 2 to first vertex 1.

A graph is a mathematical abstraction that is useful for solving many kinds of problems. A graph consists of a set of vertices, and a set of edges, where an edge is something that connects two vertices in the graph. More precisely, a graph is a pair (V,E), where V is a finite set and E is a binary relation on V. V is called a vertex set whose elements are called vertices. E is a collection of edges, where an edge is a pair (u,v) with u,v in V. In a directed graph, edges are ordered pairs, connecting a source vertex to a target vertex. In an undirected graph edges are unordered pairs and connect the two vertices in both directions, hence in an undirected graph (u,v) and (v,u) are two ways of writing the same edge.

Figure 2:
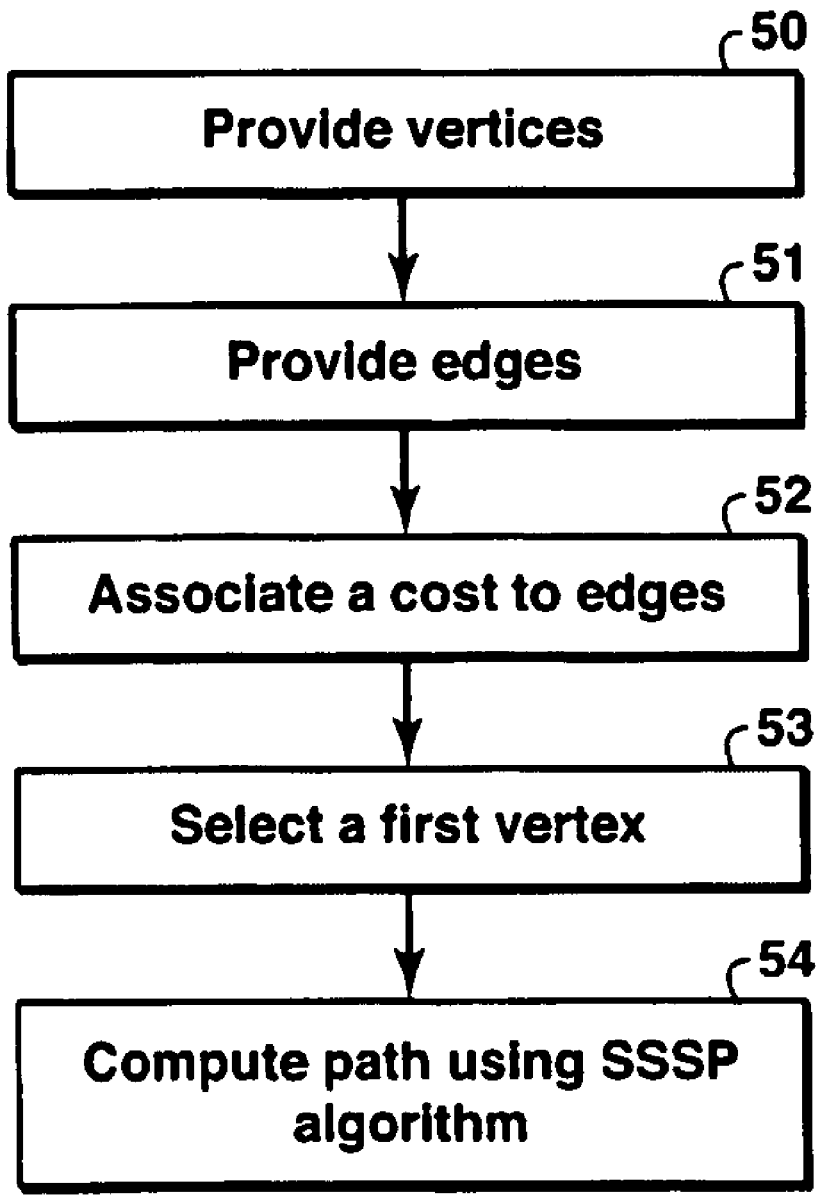
FIG. 2 is a block diagram of steps that may be completed according to some embodiments of the invention.

FIG. 2 provides an overview of the process steps involved in completing one embodiment of the invention which will be briefly discussed now and more particularly developed later herein. Step 50 includes providing a set of vertices which may be representative of a geologic reservoir. Step 51 includes providing edges which may be representative of the ability of a property to transfer between connected vertices. Step 52 includes associating a cost with some or all of the edges. The cost may be representative of the ability of the property to transfer across an edge from one vertex that is connected to another vertex. Step 53 includes selecting a vertex from the set of vertices to act as a source vertex. Step 54 includes determining a low (or high) cost path to at least one other vertex using a graph theory single-source, shortest-paths algorithm.

Figure 3:
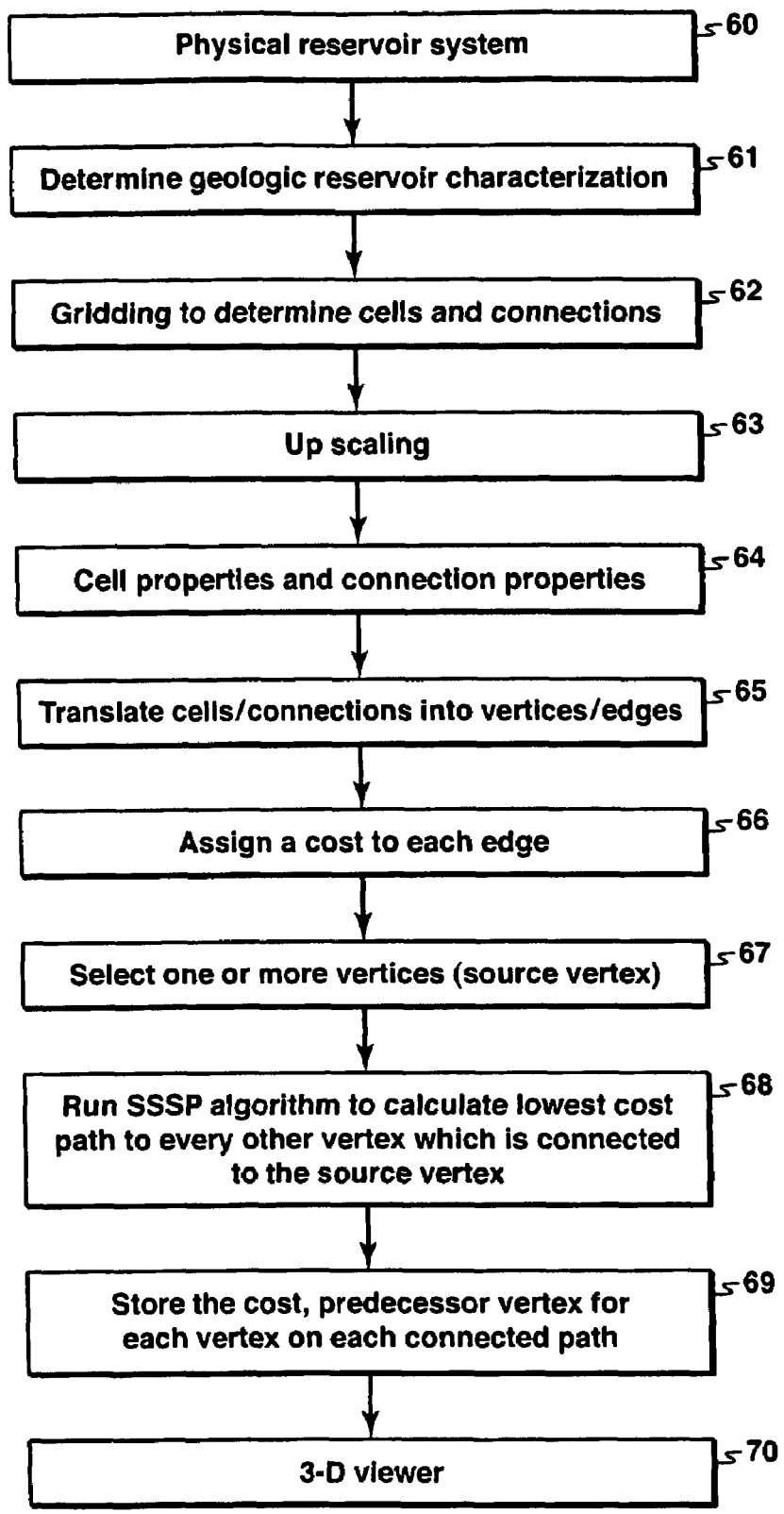
FIG. 3 is a block diagram of steps that may be completed according to some embodiments of the invention.

FIG. 3 depicts another embodiment of the invention which includes more particular steps. This embodiment begins with the physical reservoir system 60 and from the reservoir system 60 determines a geologic reservoir characterization. The geologic reservoir characterization 60 may be in the form of a 3D geologic model or geologic maps. The gridding step 62 is accomplished in order to obtain a set of cells and connections that is representative of the physical reservoir system 60. For example, in the gridding step 62 a fine structured 3D geologic model grid may be translated into a coarser scale, unstructured grid that respects the geologic features (e.g. faults and shale lenses) of the geologic reservoir. An upscaling step 63 is completed to determine the cell properties and the connection properties 64. Cell properties may include, for example, porosity, permeability and facies, that is a characterization of the type of rock present. Connection properties may include, for example, transmissibility, the distance from a cell's center to a cell face, and a cell face's area. Transmissibility may be obtained from the cell's permeability, conductance and/or cell geometry. The system of cells and connections may be translated 65 into a system of vertices and edges to form a graph. Each edge or some number of the edges contained in the graph is assigned a cost or weight 66. The cost may be chosen to represent the ability of some property to move across the respective edge. One or more vertices are then selected 67 as a source vertex and the single-source, shortest path algorithm is then run to determine the lowest cost path from the source vertex to every other vertex which is connected to the source vertex 68. The data that is stored for each vertex on a shortest path may include the identity of the predecessor vertex and the summed total path cost up to that vertex 69. Various depictions of the paths may then be displayed on a 3-D viewer 70.

Figure 4:
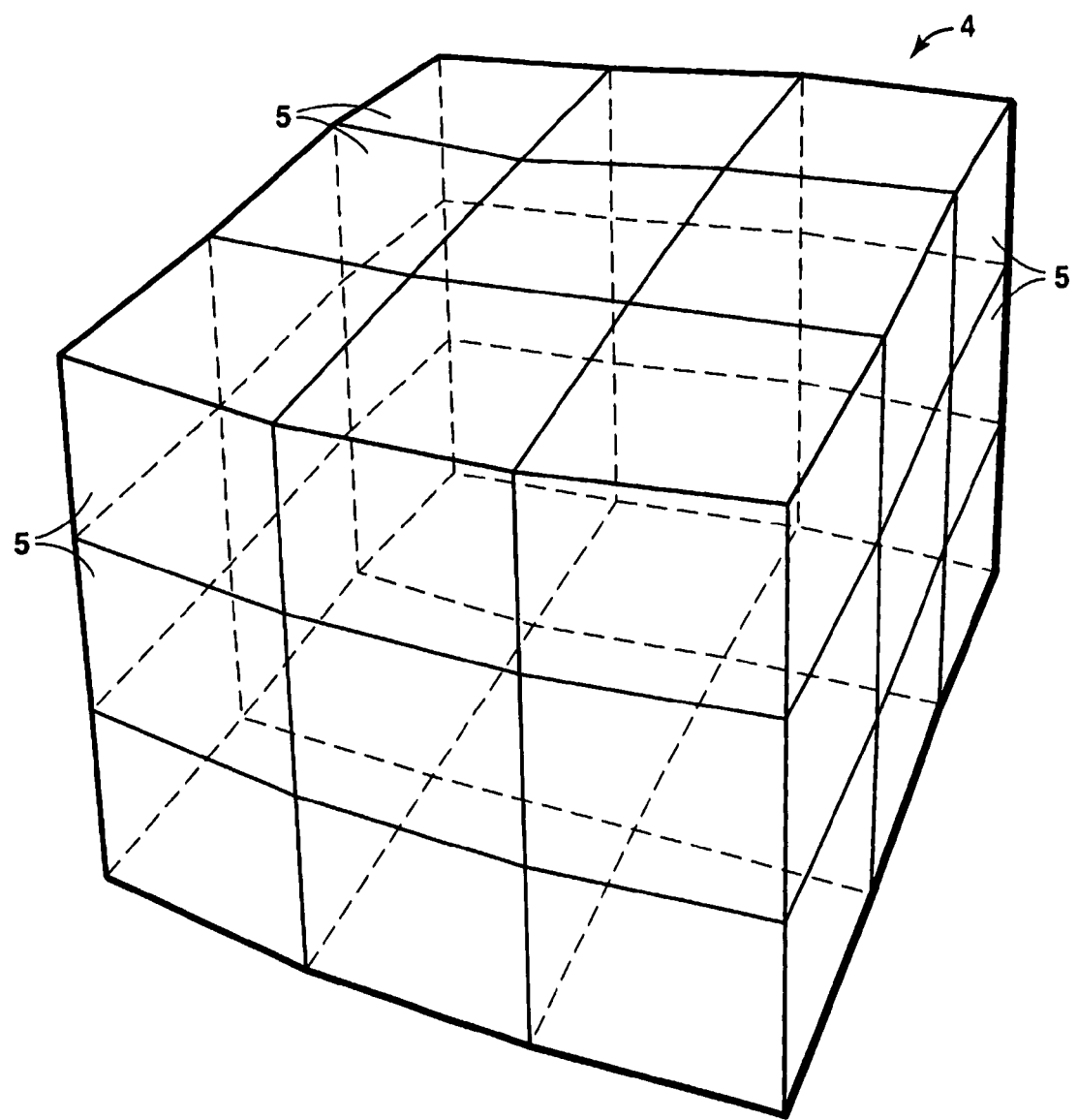
FIG. 4 is a depiction of a reservoir volume that has been discretized into a three by three by three group of volumetric cells.

Referring now to FIG. 4, in reservoir simulation a reservoir simulation grid 4 may be built by subdividing (discretizing or gridding) the reservoir volume of interest into a large number of polyhedral cells 5. The volume of interest may be defined areally and vertically by the extent of the oil and gas accumulation and of the water that is in pressure communication with the oil and gas. The area may be several square miles, and the thickness may be hundreds or even thousands of feet.

In practicing embodiments of the present invention, the physical system to be simulated may be subdivided into a multiplicity of volumetric cells as in reservoir simulation. These cells can number from fewer than a hundred to millions. The discretization may be performed using finite difference, finite volume, finite element, or other methods known in the art that are based on dividing the physical system to be modeled into smaller units. In this patent, for simplicity of presentation, the term "cell" is used, but it should be understood that if a simulation model uses the finite element method the term element would replace the term cell. Regardless of which of these methods is used, discretization reduces partial differential equations to a finite-dimensional system of algebraic equations.

In the practice of this invention, the cells can be of any geometric shape, such as parallelepipeds (or cubes) or hexahedra (typically having four approximately vertical corner edges which may vary in length), or tetrahedra, rhomboids, trapezoids, or triangles. The grid can comprise rectangular cells organized in a regular, structured pattern. Structured cells therefore have similar shape and the same number of sides or faces. The most commonly used structured grids are Cartesian or radial in which each cell has four sides in two dimensions or six faces in three dimensions. The grid can also comprise cells having a variety of shapes laid out in an irregular, unstructured pattern, or the grid can comprise a plurality of both structured and unstructured patterns. A grid is called flexible or unstructured when it is made up of polygons (polyhedra in three dimensions) having shapes, sizes, and number of sides or faces that can vary from place to place. Completely unstructured grids can be assembled that assume almost any shape. When viewed from above, all the cells are preferably, but not necessarily, boundary aligned with other cells, thereby avoiding having any side of a cell contacting the sides of two other cells.

A mathematical construct called a connection may be defined to characterize the flow of a property between each pair of neighboring cells. If a property, for example fluid mass, can be transported directly between two cells, the cells are considered "connected," and the fluid is represented as flowing through the connection between them. Alternatively a criterion may be selected to judge if two cells are connected. A cell may participate in from zero to many tens of connections, and most commonly participates in two to eight connections. Typically the total number of connections in a reservoir simulation model is three to four times the total number of cells. Properties are defined for these cell connections, just as properties are defined for the cells themselves.

The properties of cells and connections may be derived, for example, from a geologic reservoir characterization through a two-step process called gridding and upscaling. A geologic reservoir characterization may be, for example, maps which include variations of geologic properties over the reservoir area or a 3D geologic model. The geologic reservoir characterization commonly is in the form of a 3D geologic model that discretizes the volume of interest into a large number of cells similar to a reservoir simulation model. Because geologic models are not intended for use in solving transient flow equations, they can accommodate much higher spatial resolution than a reservoir simulation model. 3D geologic models typically have many more cells than a reservoir simulation model (typically hundreds of times as many), and these geologic-model cells are usually much smaller than reservoir-simulation cells.

In the gridding step, the user may lay out the reservoir simulation grid on top of the 3D geologic model. Typically, the 3D geologic model is in the form of a structured grid while the reservoir simulation grid is an unstructured grid. The reservoir simulation grid may have larger cells with irregular shapes. The upscaling step undertakes to assign properties to the reservoir simulation cells based on the properties of the geologic-model cells. It may also be used to calculate connection properties for the reservoir simulation grid based on properties of the geologic-model cells.

For example, one could estimate connection properties in the following way. First, potential connections could be identified between the geologic model's grid cells. Then a value for a property of interest, for example transmissibility, could be estimated based upon some characteristics of two neighboring cells. For example, transmissibility could be estimated based upon each cell's geometry (face area between neighboring cells and respective distance from each cell center to the face) and the permeability of each cell.

Because the geologic modeling process lacks tools to explicitly visualize connectivity, the geologic model may itself contain connectivity anomalies that escape detection using current technology. Embodiments of the invention may be applied to 3D geologic models as well as reservoir simulation models. Explicitly controlling connectivity in the geologic model would result in higher-quality reservoir simulation models. Currently, connectivity anomalies are revealed by flow simulation using reservoir simulation models. After such anomalies are revealed the geologic model is rebuilt in order to cure the anomalies. Time would be saved if the anomalies were identified in the geologic model using embodiments of the invention.

For example, one could estimate connection properties for neighboring cells as discussed above and then implement the following steps to identify anomalies. After establishing a grid of cells and connections in the geologic model one could explore the connectivity of the geologic model by applying the various embodiments of this invention. This exploration might reveal defects in the in the geologic model's connectivity. Such connectivity defects may have arisen from the geologic modeler's design of the shapes and placement of bodies or packages of permeable rock or impermeable rock. After identifying the source of the anomalies the geologic model could be corrected by exerting control over these shapes and placements, perhaps by adjusting the stratigraphic framework. This same procedure could also be used to identify and correct anomalies in a reservoir simulation model.

Figure 5:
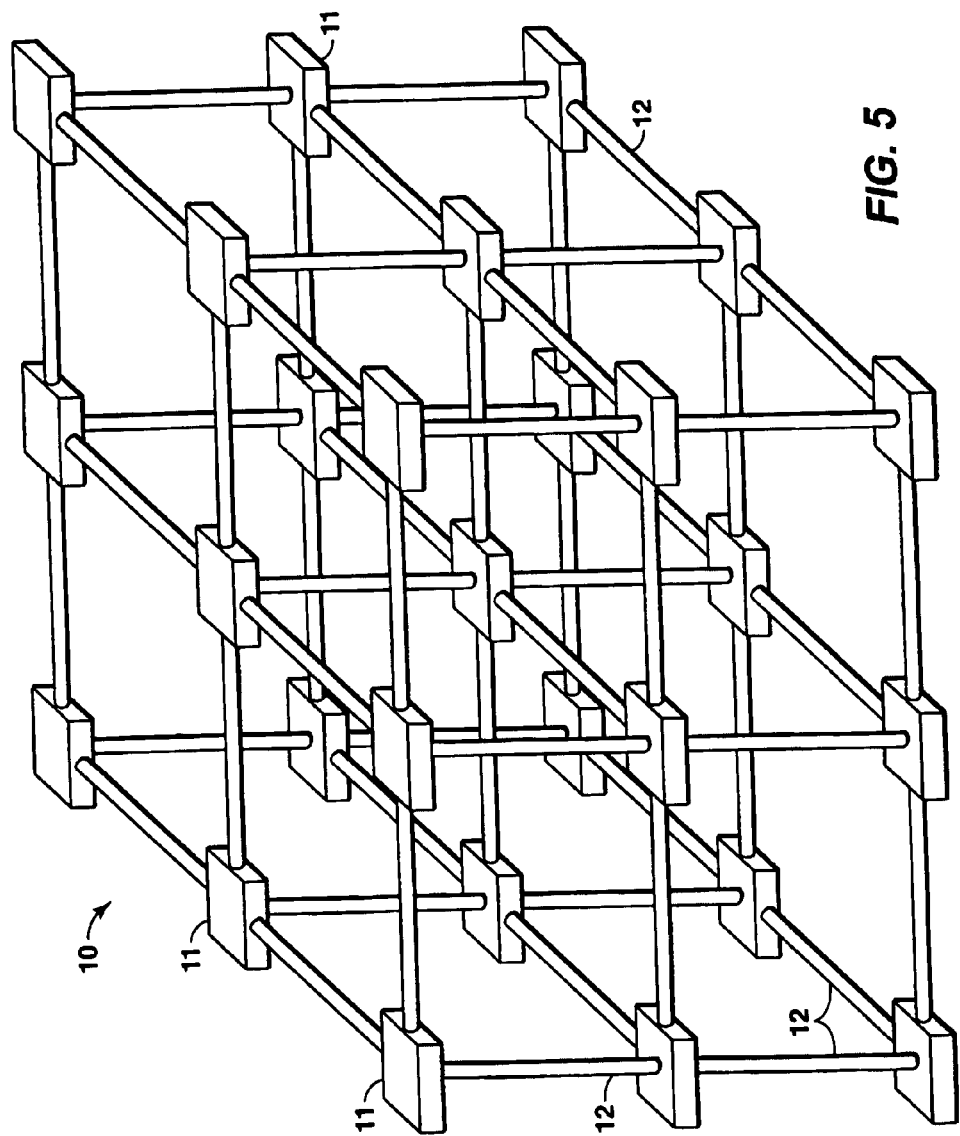
FIG. 5 is a depiction of the reservoir volume of FIG. 4 that has been further abstracted into a set of vertices and edges thereby forming a graph-theory grid.

Referring now to FIG. 5, a system of cells and connections may be translated into a graph-theory data structure 10 for use in some embodiments of the invention. Any 3D cellular model can be characterized as a collection of nodes (called vertices 11 in graph theory) linked where appropriate by connections (called edges 12 in graph theory). Vertices 11 correspond to cells, and edges 12, which correspond to connections, exist wherever two cells are connected, for example where faces of neighboring cells overlap.

Edges may have properties that include, for example, transmissibility, which is a measure of the connection's conductance to fluid flow under the influence of pressure difference between the two connected vertices. This graph-theory data structure is native to modern reservoir simulation applications, but 3D geologic models may require significant computation to identify connections and to calculate transmissibilities as discussed previously herein. The graph-theory data structure may be extended from the reservoir grid to include well completions or other oil and gas production or processing equipment. This extension allows well vertices to be on paths. In actual applications of embodiments of the invention it is common for well vertices to be designated as a source vertex or as a destination vertex. However the user may decide whether or not to permit a well vertex to be on the interior of a path, which is to say that fluid enters the well completion from one reservoir vertex and exits the well completion to a different reservoir vertex (crossflow). In the alternative case (no crossflow allowed), the well vertex may serve as the source or destination of a shortest path, but may not appear on the interior of any shortest path. Likewise, the extension to include well vertices requires the host application to be aware of the time-dependent well-completion state, because the properties of connections between a well-completion and the reservoir depend on time.

The graph-theory data structure may also be reduced by applying connection criteria to the connections to thereby reduce the number of edges. For example, connections may be formed for any cells that have any overlap with neighboring cells or between cells that otherwise have the potential for fluid flow. The resulting connections can be further evaluated in the process of translating connections into edges. For example, each connection may be tested against certain criteria. Connections that fail the criteria are not translated into edges while connections that pass the criteria are translated into edges. A non-limiting example of a connection-edge criterion includes the requirement that transmissibility exceeds a specified minimum value. Alternatively, connections could be tested by setting criteria for one or both of a connection's cells. If one or both of a connection's cells failed any of the criteria, then the associated connection would not translate into an edge in the graph-theory data set.

To assure the highest confidence in predictions of future performance, the reservoir simulation model may be calibrated using historical performance data, which most often consist of measurements at regular intervals of produced fluid volumes and periodic measurements of pressures in wells. This calibration process is called history matching. History matching commonly requires revising volume, connectivity, and structure (elevations of key surfaces).

History matching commonly reveals that reservoirs comprise a collection of compartments. Intra-compartment connectivity is relatively high, and inter-compartment connectivity is relatively low. Compartments may be delineated by faults (structural disruptions that tear stratigraphic surfaces) or by stratigraphic features such as laterally extensive shales. Modern reservoir-simulation grids commonly have tens to hundreds of faults and several stratigraphic units. The ability to understand and control intra- and inter-compartment connectivity is useful for successful building and history-matching reservoir simulation models. Embodiments of the invention may be used to complete history matching to adjust connection/edge properties, for example to reduce transmissibility of a connection/edge that connects cells/vertices on different sides of a fault.

After the graph-theory data structure is established for the physical system, the user can associate a cost or weight with some or all of the edges in the data structure. The cost of an edge may be defined by the user. In reservoir simulation, resistance to flow is a cost that is well-suited to assessing connectivity and can be calculated using only input properties. Consequently, embodiments of the invention may be used as a tool for finding paths of least resistance in a reservoir.

For purposes of brevity, the term "shortest path" should be understood to mean "minimum-cost path" within this document. A path is a sequence of vertices and the path cost is the sum of the costs over the edges connecting successive vertices in the path. Using distance as the cost measure is useful only to illustrate that the path of least resistance is almost always longer (more tortuous) than the shortest path.

If edge-cost is chosen to be the reciprocal of transmissibility, the path cost can be interpreted as the pressure difference needed to induce a flow of a unit-mobility fluid at a volumetric rate of one standard unit. In oilfield units (volumetric flow rate in barrels per day, pressure in pounds per square inch, and viscosity in centipoise), this means the path cost is the pressure difference in pounds per square inch needed to induce a flow of one barrel per day of a fluid with viscosity of one centipoise and a relative permeability of one. Therefore the path cost may have physical meaning and is not just a mathematical abstraction in embodiments of the invention. The best path could mean, for example, the path likely to conduct most of the fluid flow if a potential (pressure) difference were imposed between the two cells. If the two cells are not connected, there is no best path.

Edge properties may include flow rates and resistance to flow for each fluid phase. The flow rate for a specific phase on a edge may be calculated as the product of three terms: transmissibility, phase mobility and phase potential difference.

Transmissibility is the component of conductance that is independent of the fluid phases and depends only on permeability and grid geometry. The value is roughly the permeability times the face area divided by the distance between cell centers. More precisely, it attempts to account for the permeability field and the grid geometry so as to yield approximately accurate flow rates when multiplied by phase mobility and phase potential difference. Calculating reasonable connection/edge transmissibilities is not a trivial undertaking, but it is useful in reservoir simulation. One method of calculating transmissibility uses neighboring cell geometry and permeability as discussed earlier herein. Calculating connection/edge transmissibility can have a significant effect on the resulting model. Transmissibility can vary greatly depending on the methodology used during scale-up because it condenses so much information into so little. Transmissibilities are generally constant over time unless permeability or grid geometry depends on fluid pressure.

Phase Mobility is the phase-dependent component of conductance. The value is the phase relative permeability divided by phase viscosity. It reflects how readily this phase flows in response to a pressure gradient (low-viscosity fluid flows more readily) and how successfully this phase competes with other phases (higher relative permeability is more successful). Phase mobility is normally evaluated using the properties of the "upstream" cell (the one with higher potential).

Phase Potential Difference between the participating cells. This is the driving force for flow. It depends on pressures, elevation of the cell (gravity), and relative amounts (saturations) of the phases.

In heat transfer applications, the heat flux, heat capacity or thermal conductivity of the fluid phase and/or the geologic strata could be used as edge properties. In chemical component transfer analysis, flux of a constituent, concentration differences, coefficient of diffusion or diffusivity could be used as edge properties. In electrical current investigations, electrical conductivity of the fluid phase and or geologic strata could be used as edge properties.

The invention uses graph-theory single-source, shortest paths algorithms to find the lowest cost path between a source vertex and one or more destination vertices. One problem in graph theory is to find the shortest path between two vertices in a graph. More formally, a path is a sequence of vertices $<v_0, v_1, \ldots, v_k>$ in a graph $G=(V, E)$ such that each vertex is connected to the next vertex in the sequence (the edges $(v_i, v_{i+1})$ for $i=0, 1, \ldots, k-1$ are in the edge set E). In the shortest-path problem, each edge is given a weight or cost. The weight or cost of a path may be represented as follows:

$w(p)$=sum from $i=1 \ldots k$ of $w(v_{i-1}, v_i)$

The shortest path cost from vertex u to v is then:

delta$(u,v)$=min$\{w(p):u \rightarrow v\}$ if there is a path from u to v delta$(u,v)$=infinity otherwise.

A shortest path is any path whose path cost is equal to the shortest path weight.

There are several variants of the shortest path problem. (See Hirsch and Schuette, page 130). Discussed above is the single-pair problem, but there are also the single-source problem (all shortest paths from one vertex to every other vertex in the graph), the equivalent single-destination problem, the all-pairs problem, and the K-shortest paths problem. It is the algorithms that solve the single-source problem that are used in the present invention method.

Figure 6:
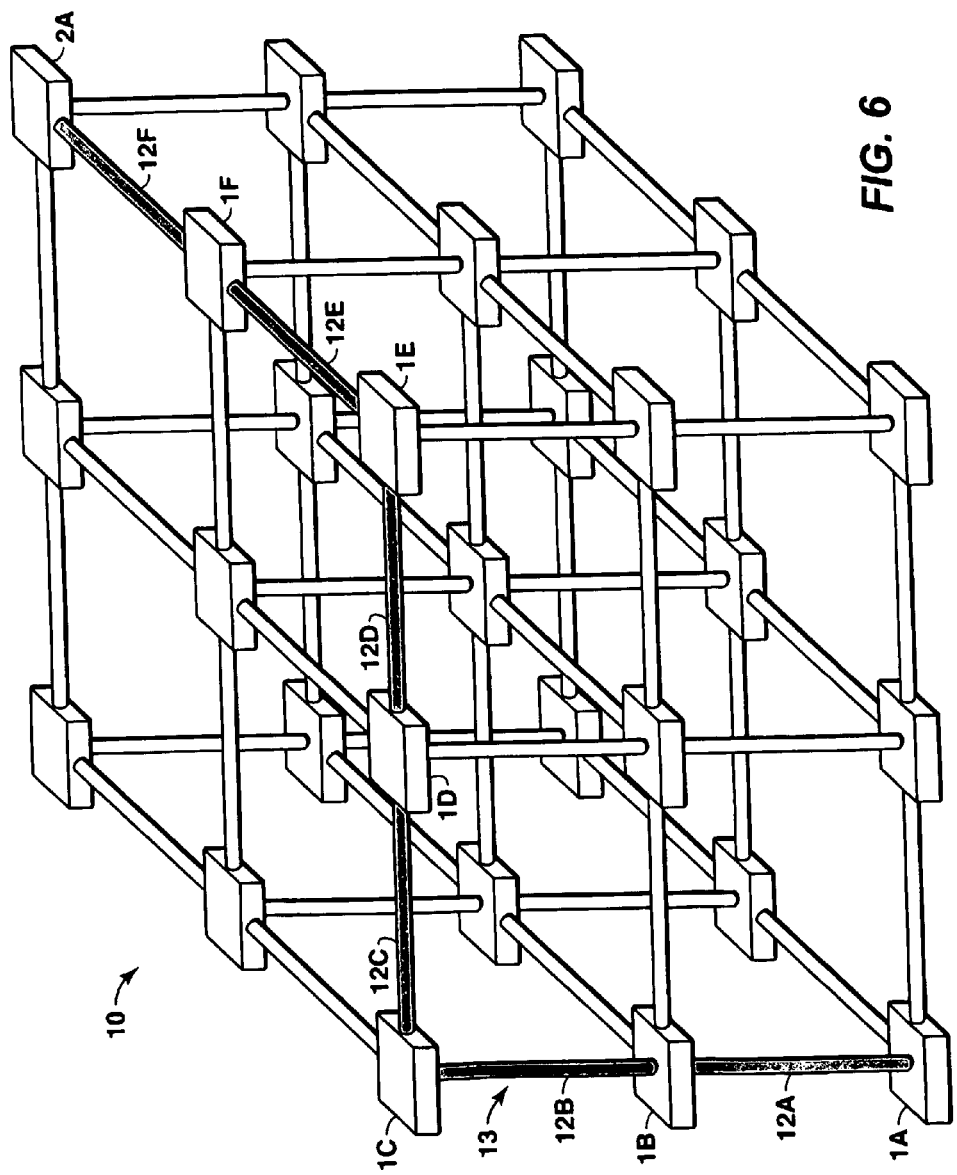
FIG. 6 is a depiction of the grid of FIG. 3 which includes a depiction of a lowest cost connected path from one vertex to a second vertex.

A graphical depiction of the shortest path solution is depicted in FIG. 6. A user may wish to find the lowest cost path from first vertex 1A to second vertex 2A. In the graph-theory data structure 10, each edge would have an associated cost value. The depicted solution, or path 13, would represent the lowest summed cost across any path from first vertex 1A to second vertex 1B. Here the solution path 13 travels through vertices 1A, 1B, 1C, 1D, 1E, 1F to destination vertex 2A. The solution path 13 also travels through the edges contained between the above-listed vertices, that is through edges 12A through 12F. The total cost of the solution path 13 is found by summing the costs associated with each of the edges (12A-12F) located on the path 13.

The invention uses a single-source, shortest paths (SSSP) algorithm, for example, Dijkstra's algorithm, which was published in 1959 and is widely used in such familiar applications as route-planning for a road trip. It finds the path from a source node (vertex) to a destination node (vertex) that minimizes the summation over the path (edges) of an edge property (the cost). A remarkable property of Dijkstra's algorithm is that it finds all shortest (minimum-cost) paths from a particular source vertex to all destination vertices just as quickly as it finds a single shortest path from that source to a particular destination vertex. Another example of a SSSP algorithm that may be used in the invention is the Bellman-Ford algorithm.

In embodiments of the invention, the simplest illustrative cost property is the reciprocal of transmissibility, but could be any edge property (for example, the reciprocal of the product of transmissibility and phase mobility, where mobility is relative permeability divided by viscosity). The invention may implement Dijkstra's SSSP algorithm using a priority queue that in turn uses a binary heap.

The following description of Dijkstra's algorithm quotes and paraphrases T. H. Cormen, C. E. Leiserson, R. L. Rivest. *Introduction to Algorithms*, The MIT Press, 1990. The pseudo code listing below is for Dijkstra's algorithm for the single-source shortest-paths problem on a weighted (i.e., cost containing), directed graph $G=(V, E)$ where all edge weights are non-negative. That is $w(u, v) \geq 0$ for each edge $(u, v) \in E$.

Dijkstra's algorithm maintains a set S of vertices whose final shortest-path weights from the source s have already been determined. The algorithm repeatedly selects the vertex $u \in V-S$ with the minimum shortest-path estimate d, inserts u into S, and relaxes all edges leaving u. This implementation maintains a priority queue that contains all the vertices in V−S, keyed by their d values. This implementation assumes that the graph G is represented by adjacency lists, which facilitate the identification of all neighboring vertices for any specific vertex.

```
               DIJKSTRA(G,w,s)
   1           INITIALIZE-SINGLE-SOURCE(G,s)
   2           S ← 0
   3           while Q ≠ 0
   4               do      u ← EXTRACT-MIN(Q)
   5                       S ← S ∪ {u}
   6                       δ[u] ← d[u]
   7                       for each vertex v ∈ Adj[u]
   8                           do      RELAX(u ,v, w)
```

1. Invoke the method INITIALIZE-SINGLE-SOURCE.
2. Assign the empty set to the set S of vertices whose final shortest-path weights from the source s have already been determined.
3. Repeat Steps 4-7 as long as the priority queue Q contains vertices.
4. Remove from the priority queue Q the vertex u with the smallest value for the shortest-path estimate d[u].
5. Add this vertex u to the set S of vertices whose final shortest-path weights from the source s have been determined.
6. Assign the shortest-path estimate d[u] to the shortest-path weight δ[u], which is the same as formally concluding that no shorter path can be found from the source s to this vertex u.
7. Repeat Step 8 for each neighboring vertex v of the just-added vertex u, i.e., relax all edges (u, v) of vertex u.
8. Invoke the edge-relaxation method RELAX(u, v, w) for the edge (u, v) and its weight w.

```
               INITIALIZE-SINGLE-SOURCE(G, s)
   1           for each vertex v ∈ V[G]
   2               do      d[v] ← ∞
   3                       π[v] ← NIL
   4                       INSERT(Q, V)
   5           d[s] ← 0
```

1. Repeat the Steps 2-4 for each vertex v in the graph G.
2. Assign infinity (or a very large, positive number) as the value of the shortest-path estimate d[v] for the weight of a shortest path from the source s to v.
3. Assign the NIL vertex to the predecessor field π[v] for vertex v. The value of π[v] is either another vertex or NIL. Shortest-paths algorithms set the π attributes so that the chain of predecessors originating at a vertex v runs backwards along a shortest path from s to v.
4. Insert vertex v in the graph G into the priority queue Q using as the key field the shortest-path estimate d[v] for the weight of a shortest path from the source s to v.
5. Assign zero as the value of the shortest-path estimate d[s] for the weight of a shortest path from the source s to itself. This is known at the outset, because the source vertex s is special.

|   | RELAX(u,v,w) |   |
|---|---|---|
| 1 | if | d[v] > d[u] + w(u,v) |
| 2 |   | then  d[v] ← d[u] + w(u,v) |
| 3 |   | DECREASE-KEY(Q,v) |
| 4 |   | π[v] ← u |

Relaxation decreases an upper bound d[v] on the actual shortest-path weight of a vertex δ[v] until the upper bound equals the shortest-path weight δ[v]. Relaxation is the only means by which shortest-path estimates and predecessors change. The process of relaxing an edge (u, v) consists of testing whether by going through u we can improve the shortest path to v found so far, and if so, updating v's shortest-path estimate d[v] and predecessor field π[v]. In effect, vertex u is being evaluated as an improved predecessor for its neighboring vertex v.

1. If the current shortest-path estimate d[v] for the weight of a shortest path from the source s to vertex v is greater than the shortest-path estimate d[u] for vertex u plus the (non-negative) weight w(u, v) for the edge (u, v) that leads from u to v, then implement Steps 2-4. That is, u is an improved predecessor for v because the path to v through u reduces the shortest-path estimate d[v] for v.
2. Update (reduce) the shortest-path estimate d[v] for vertex v by assigning to it the sum of the shortest-path estimate d[u] for vertex u plus the (non-negative) weight w(u, v) for the edge (u, v) that leads from u to v.
3. Implement the DECREASE-KEY method for vertex v in the priority queue Q to account for the reduction in the shortest-path estimate d[v], because the shortest-path estimate is the key field for the priority queue. This update ensures that the EXTRACT-MIN method will work properly.
4. Update the predecessor field π[v] for vertex v by assigning to it the vertex u, which has been identified as an improved predecessor for v.

A priority queue is a data structure for maintaining a set Q of elements, each with an associated value called a key. A priority queue supports the following operations (among others):

1. INSERT(Q, x) inserts the element x into the set Q in a way that preserves sorting by the key value. This operation could be written as Q←Q∪{x}.
2. EXTRACT-MIN(Q) removes and returns the element of Q with the smallest key.
3. DECREASE-KEY(Q, x) updates the priority queue (by preserving the sorting by key value) to account for a change in the key value for element x.

In Dijkstra's algorithm, the elements in the priority queue are vertices v in the set V–S, which is the set of vertices whose shortest paths from the source s have not yet been determined. The key is the shortest-path estimate d[v] for the weight of a shortest path from the source s to v.

The role of the priority queue in Dijkstra's algorithm is to efficiently preserve sorting by the shortest-path estimate as these estimates are reduced as a consequence of relaxing edges. The alternative would be to re-sort the set V–S each time an edge relaxation reduces d[v].

To understand a priority queue, consider people waiting in line for some kind of service, like at a bank or post office. A person is an element x. The person's key is his time of arrival at the queue. Each new person goes to the end of the line, which corresponds to the INSERT operation. When service is available, a person leaves the head of the line, corresponding to the EXTRACT-MIN operation.

But if the key were a random number drawn by the person upon arrival then the line would be ordered with the lowest key at the head and the highest key at the tail. A new arrival would insert himself in the line (the INSERT operation) according to the key he drew, and his original position could be anywhere along the line. The EXTRACT-MIN operation would still remove the person at the head of the line. If an individual already in line could draw a new random number (key), he would have to re-position himself in the line according to his new key so as to preserve the ordering of key values from lowest at the head to highest at the tail. This corresponds to the DECREASE-KEY operation.

A priority queue may be implemented using a binary heap data structure. The procedures that update binary heaps preserve sorting by enforcing the "heap property." For an SSSP algorithm, the heap property is that the key-field value of each of at most two child nodes is greater than or equal to the key-field value of a parent node. The priority-queue operations may be implemented using corresponding binary-heap procedure:

1. INSERT (Q, x) may be implemented by HEAP-INSERT(A, k)

2. EXTRACT-MIN(Q) may be implemented by HEAP-EXTRACT-MIN(A)

3. DECREASE-KEY(Q, x) may be implemented by HEAP-DECREASE-KEY(A, i, k)

where A is an array that represents a heap and k is the key value for element x, and i is the index of a node.

Both HEAP-INSERT(A, k) and HEAP-DECREASE-KEY(A, i, k) use iteration to enforce the heap property while updating the heap. HEAP-EXTRACT-MIN(A) invokes the heap operation HEAPIFY(A, i), which is usually implemented using recursion. An alternate implementation of INITIALIZE-SINGLE-SOURCE (G, s) may also use the recursive HEAPIFY(A, i) operation rather than the iterative Heap-Insert(A, k).

For large graphs associated with reservoir simulation models or geologic models, recursion may exhaust the computer's available stack memory and may slow the execution of heap operations. Memory exhaustion and speed impairment may result with graphs of more than a few hundreds of thousands of vertices. Embodiments of the invention may substitute an iterative implementation of HEAPIFY(A, i) for the conventional recursive implementation to avoid the memory exhaustion and reduced speed associated with the recursive implementation.

In summary, Dijkstra's algorithm solves the single-source shortest-paths problem on a weighted (i.e. containing costs) graph (directed or undirected), provided all edge-weights are nonnegative. Dijkstra's algorithm maintains a set of vertices whose final shortest-path weights from the source have already been calculated, along with a complementary set of vertices whose shortest-path weights have not yet been determined. The algorithm repeatedly selects the vertex with the minimum current shortest-path estimate among those whose shortest-path weights have not yet been determined. It updates the weight estimates to all vertices adjacent to the currently selected vertex (this updating is commonly referred to as "relaxation" of the edges between these vertices). The vertex is then added to the set of vertices whose final shortest-path weights have been calculated. It continues to do this until all vertices' final shortest-path weights have been calculated (until the set of vertices whose shortest-path weights have not been determined is empty).

The SSSP algorithm may yield the following results for each vertex in the graph. The SSSP algorithm may yield the path cost from the source vertex to the current vertex. If the current vertex is not connected to the source vertex, a special value may be assigned to path cost, either negative or large and positive.

The SSSP algorithm may yield the identity of the predecessor vertex on the shortest path. The source vertex has no predecessor, so its predecessor data item may be assigned a special value. Embodiments of the invention capture the identity of the edge between the predecessor vertex and the current vertex. This facilitates building an edge-view of shortest paths (as opposed to the conventional vertex-view). The vertex-view and edge-view are foundations for separate (vertex and edge) styles of 3D rendering and analysis.

Embodiments of the invention may alternatively include a 3D vertex-viewer included in the cellular-modeling computing application. 3D viewers include any of the body of software methodologies for displaying a three-dimensional representation of a geologic reservoir. 3D viewers typically display the geologic reservoir in a multitude of colors and can be manipulated through a user interface to alter the content and quality of the graphical representation. There are various 3D viewers known in the art. Implementation of the invention within the 3D viewer of a geologic-modeling or reservoir-simulation application yields a fast, interactive means of quantitatively assessing connectivity in even the most complex models. The 3D viewer may be used to display two-dimensional renderings of the three-dimensional collections of cells that make up the cellular model. Each cell's color may be determined by the value of a user-selected cell property and by user-selected controls on the correspondence between color and value (the color legend). The 3D viewer may be used as the home for the dialog (user interface) through which the user controls and applies embodiments of the invention. A 3D-viewer-based dialog may support embodiments of the invention in various ways, for example, by setting controls for shortest-path computations, through input processing, by selecting computational tasks and by viewing results.

A 3D-viewer-based dialog may be used in setting controls for shortest-path computations. The 3D-viewer-based dialog may be used in defining the cost to be minimized for the shortest paths computation. This cost may be evaluated for each edge and accumulated over the sequence of edges associated with the path. For example, the edge cost may be the reciprocal of transmissibility. Other illustrative examples include the connection length (distance) and the reciprocal of [transmissibility multiplied by phase mobility].

A 3D-viewer-based dialog may be used in defining vertex and edge criteria. Vertices and edges that fail the criteria would be excluded from participating in any path. An example is, edge transmissibility must be at least 0.001 (RB-cp)/(d-psi), otherwise, the edge is ignored. A 3D-viewer-based dialog may be used in determining whether or not to extend the graph from reservoir vertices only by adding well vertices. A 3D-viewer-based dialog may be used in determining whether or not well vertices may be on the interior of a path or are restricted to participating only as source or destination vertices, i.e., whether or not to permit crossflow. This setting should be controllable for each individual well vertex.

A 3D-viewer-based dialog may be used to accomplish input processing. When launching the SSSP algorithm in some embodiments of the invention it is useful to have a list of one or more source vertices. Source vertices may be, for example, either reservoir vertices or well vertices. Reservoir vertices may be added to the list by exposing a cell (vertex) to view, selecting the cell with the mouse, then clicking. Well vertices may be added to the list by selecting them by name from a list. Some uses of the invention may use a list of one or more destination vertices. Composing this list of destination vertices may be accomplished using the 3D viewer in exactly the same manner as for composing the list of source vertices.

A 3D-viewer-based dialog may be used in selecting the computational task to be preformed. Illustrative examples of such tasks include the following. Computing all shortest paths for each member in the current list of source vertices. Every vertex is a potential destination vertex. Using embodiments of the invention, the SSSP computations take about one second per source vertex. Another example includes identifying and displaying specific shortest paths for the current list of destination vertices. This process is effectively instantaneous. Another example includes conducting a multi-source competition. This means that each vertex is assigned an owner vertex from the current list of source vertices. The owner vertex is the source vertex that minimizes cost compared with other source vertices in the list. In effect, this process identifies for every potential destination vertex the source vertex to which the destination vertex is best connected (i.e., connected with minimum cost). This assignment takes about one second.

Additional examples include computing user-defined cumulative measures as a function of cost for each of the source vertices and displaying the results graphically. An example measure is the volume of oil. The relative merits of drilling locations could be assessed by the accessibility of the location (the source vertex) to oil. Better locations have greater amounts of oil at lower cost (less resistance to flow). Another example includes managing the special task of determining shortest paths between all possible pairs of wells. Example 2 discusses this in detail. Another example includes exporting to a file results from any of the above computational tasks. The exported data may be supplemented by user-selected vertex properties and edge properties. Captured data are the source-vertex identifier, the current-vertex identifier, the predecessor-vertex identifier, the predecessor edge identifier, the path cost, and user-selected properties for the current vertex and for the predecessor edge.

A 3D-viewer-based dialog may be used in viewing results. The computational tasks yield vertex properties that allow the user to view the results of the invention using the standard features of the 3D viewer. Paths are indicated by displaying the cells that correspond to vertices on the path rather than by rendering a 3D polyline whose segments connect cell centers and face centers along the path. The user chooses which property to display.

For example, the viewing of results may include viewing all shortest paths for a selected source vertex. In most cases the user will display the cost property, whose value is the cost of the shortest path from the selected source vertex. The source vertex has a cost of zero. Vertices that have no path connecting them to the source vertex have a special value for cost, either a negative value or a large, positive value.

One approach to understanding the all-shortest-paths (all shortest paths for a single source vertex) results is to use the viewer's threshold tool (also known as a filter). The threshold tool may be used to display only those vertices that satisfy user-specified criteria evaluated using the vertex's properties. For an integer-valued property, the user specifies a list of values. For a real-valued property, the user defines a range of values by specifying minimum and maximum values. When viewing the all-shortest-paths results for a selected source vertex, the user thresholds on the cost property, specifying a range from zero to some small, positive value. The viewer displays all paths with costs in this range. By nudging the upper end of the cost range, the user can develop a feel for the way in which the source vertex is connected to its neighborhood. In many cases, the all-shortest-paths view is overwhelming, and it is necessary to view specific shortest paths.

Figure 7:
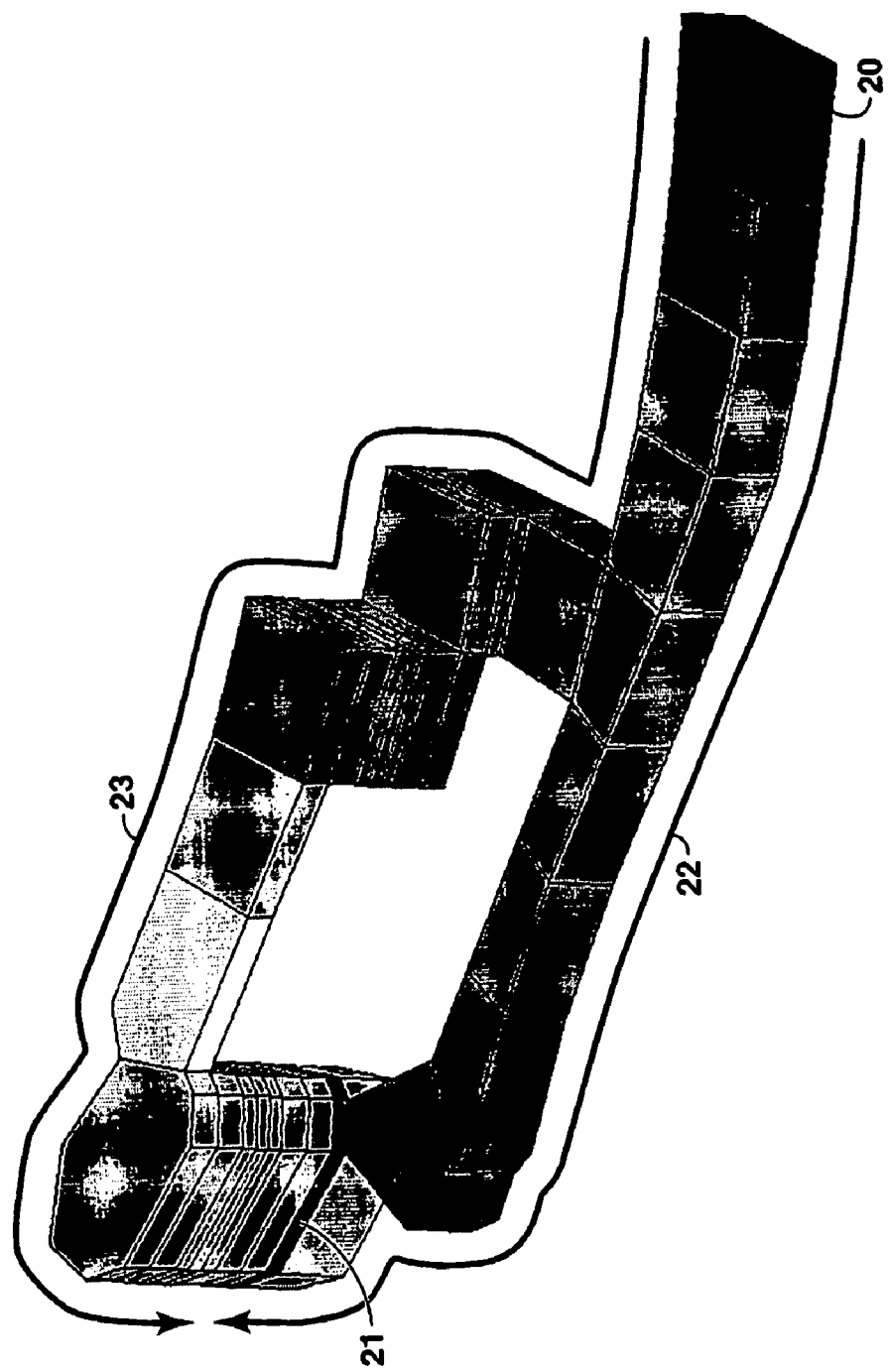
FIG. 7 is a depiction of two paths from a source vertex to a destination vertex that have been generated on a 3D viewer.
Figure 8:
FIG. 8 is another depiction of two paths from a source vertex to a destination vertex that have been generated on a 3D viewer.

Another example of viewing results includes viewing specific shortest paths from a selected source vertex (or competition among a set of source vertices) to a list of selected destination vertices. A specific path consists of the sequence of vertices that starts at the source vertex and ends with the destination vertex, with ascending cost en route. When the user selects the source-vertex list and launches the all-shortest-paths computation (which takes about one second per source vertex), the 3D viewer is capable of instantaneously displaying specific shortest paths to selected destination vertices. The viewer composes this display by identifying the vertices on the shortest path(s) and displaying only these vertices (in effect, imposing a hidden threshold condition). For example, FIG. 7 is a graphical depiction of a lowest cost connected path 23 from a source vertex 20 to a destination vertex 21. FIG. 7 also depicts the minimum distance path 22 from source vertex 20 to destination vertex 21 as a contrast to show that the lowest cost path 23 is often less direct (more tortuous) than the shortest minimum distance path 22. Similarly FIG. 8 depicts a more extreme example of the lowest cost path 23B being more tortuous than the minimum distance path 22B. Cost and distance values for the four minimum paths are given in Table 1.

TABLE 1

| Figure | Path | Distance, ft | Cost, (psi-day)/(reservoir barrel - centipoise) |
|---|---|---|---|
| 7 | 22 | 1891 | 3.30 |
| 7 | 23 | 2237 | 0.31 |
| 8 | 22B | 1053 | 2,100,000.00 |
| 8 | 23B | 3511 | 8.60 |

Another example (see Example 5) of viewing results includes viewing a collection of specific shortest paths between multiple sources and multiple destinations. Such displays suffer a loss of information (path cost and identity) whenever paths from different sources overlay, because the 3D viewer only accommodates a single value per vertex for each property. The user may accept this loss of information, or may select a feature that creates multiple views, each of which is guaranteed to have no overlapping paths. However, overlapping paths do not suffer a loss of information if the paths have the same source.

Another example of viewing results includes viewing the results of a multi-source competition. A multi-source competition adds the notion of owner source-vertex. The user may use the 3D viewer's threshold tool to display a subset of owner source-vertices, as few as one owner at a time, or as many as all owners at once. For a particular selection of owner vertices, the user may choose to view all shortest paths (typically thresholding on maximum cost) or to view specific shortest paths to selected destinations.

Another example of viewing results includes viewing a line-graph (i.e., not a 3D rendering) of the cumulative distribution function (CDF) of all path costs for selected sources. This feature is described in Example 4.

Embodiments of the invention may be used to determine along which path would fluid flow if a pressure difference were imposed between vertex A and vertex B and if the fluid were required to choose a single, best path. Conventional solutions to this problem would define wells associated with vertices A and B, then solve flow equations to determine the velocity field. Defining wells is cumbersome, solving flow equations is slow, and interpreting the results is challenging.

Embodiments of the invention may use existing cellular models that are readily cast as graphs (nodes (vertices) and connections (edges)), and graph-theory algorithms that efficiently solve the shortest-path problem. Where conventional approaches require that wells be defined, embodiments of the invention require only a point-and-click of the mouse (a handheld pointing device used to point to spots on the computer monitor) to mark vertices A and B. Where conventional approaches require minutes to tens of hours to solve flow equations, embodiments of the invention require about one second to find all shortest paths. Where the results of conventional approaches are difficult to interpret, embodiments of the invention show paths by displaying the sequence of cells that make up the path.

Embodiments of the invention may increase the flexibility and speed of designating a source vertex and destination vertex. Any cell (or well) can play the role of source or destination and can be selected with a mouse click in the 3D viewer. No additional input is needed, in contrast with the complex input needed to describe a well for conventional flow simulation. Embodiments of the invention may display results very quickly. The single-source, shortest paths (SSSP) algorithm identifies all shortest paths from one source to all destinations in about one second. Displaying shortest paths from a source to any set of destinations may be instantaneous. Embodiments of the invention may be used to display visual results that are easily understood. Individual paths may be displayed as an unequivocal sequence of connected cells.

The following prophetic examples are provided as illustrative examples of potential uses of embodiments of the invention.

EXAMPLES

Example 1

Leak Detection

Users often attempt to impose field segmentation or compartmentalization in their reservoir simulation grid such that there is limited or no communication among compartments. However, flow simulation may reveal that there is in fact communication as evidenced by unanticipated pressure changes in one compartment apparently induced by production from or injection into a second compartment that was assumed to be isolated from the first. The user's objective is often to find and seal the leak(s) between the two compartments. These leaks will be from one to many edges whose transmissibilities are too large.

One way to find a leak is to display the path of least resistance between a vertex in one compartment and a vertex in the other compartment. This task could be called, "single source, single path." It is accomplished as follows:

1. In the 3D viewer, launch the shortest-path dialog, using the default definition of path cost (the reciprocal of edge transmissibility).
2. Pick a single source vertex either as a cell in Compartment 1 (pick by pointing at the cell with the mouse, then clicking) or as a well (-vertex) in Compartment 1 (point-and-click on the well, or select it from a list). A well vertex typically connects to multiple reservoir vertices, so the user must be confident that all such reservoir vertices are in Compartment 1.
3. Launch the SSSP calculation to determine all shortest paths for the selected source vertices (in this case, a single source vertex). This calculation takes about one second.
4. Using the dialog, choose the feature to display paths from selected sources to selected destinations. Pick a destination vertex (cell or well vertex) in Compartment 2.

The resulting 3D viewer display shows the path of least resistance between the two selected vertices. The shortest-path dialog may also provide the capability of managing (viewing and exporting to file) the shortest-path data, expressed either as a sequence of vertices (and user-selected vertex properties) or as a sequence of edges (and user-selected edge properties).

The user could inspect the edge data for the purpose of choosing one edge as a target for transmissibility editing. There should be a geologic basis for picking this target edge, such as association with a fault or stratigraphic sequence boundary. The editing action could include setting transmissibility to a tiny value (even zero) on the target edge. One choice for the target edge is the one that connects a vertex in Compartment 1 to a vertex in Compartment 2.

Figure 9:
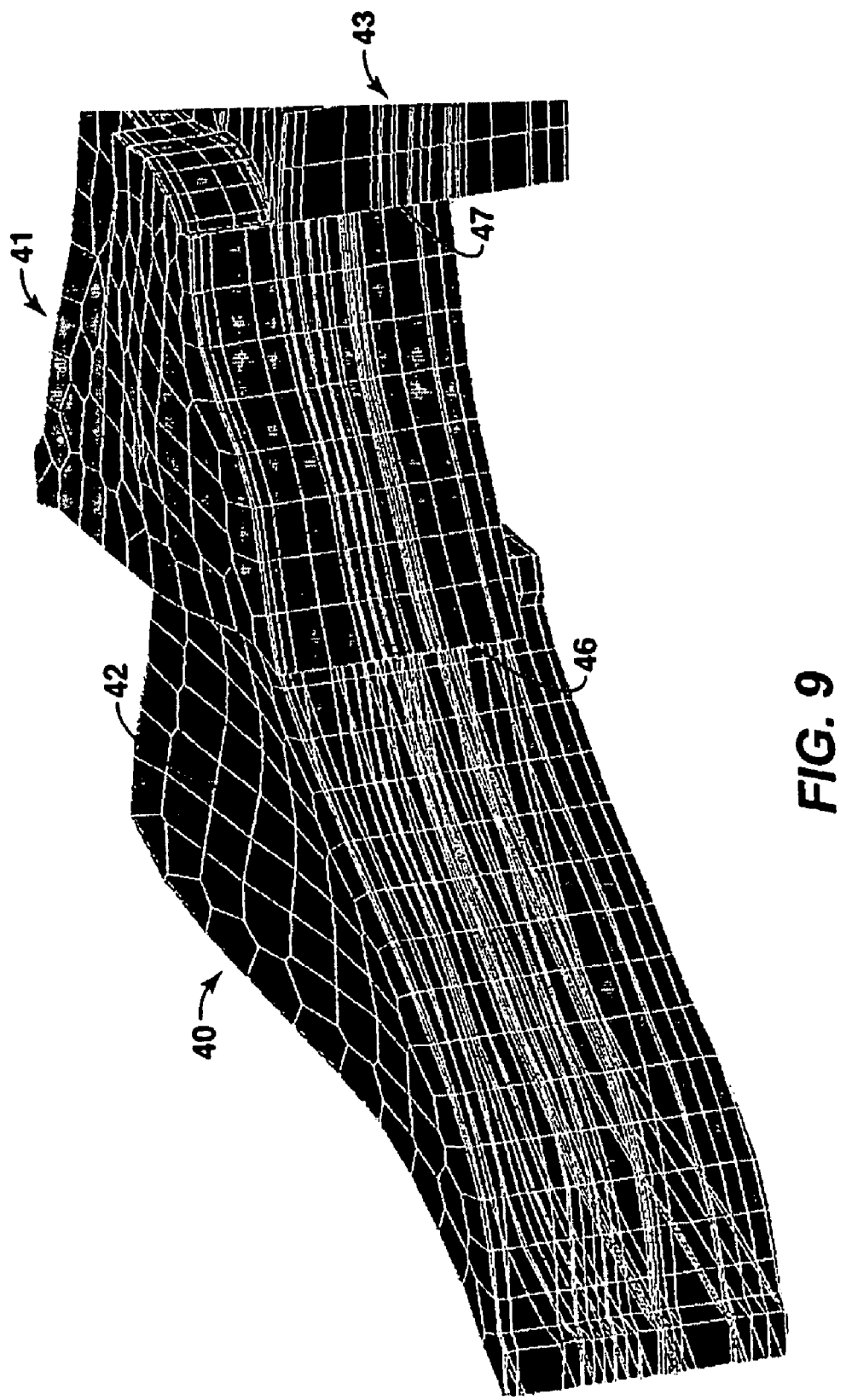
FIG. 9 is a depiction that has been generated on a 3D viewer of two reservoir compartments that are separated by a fault.
Figure 10:
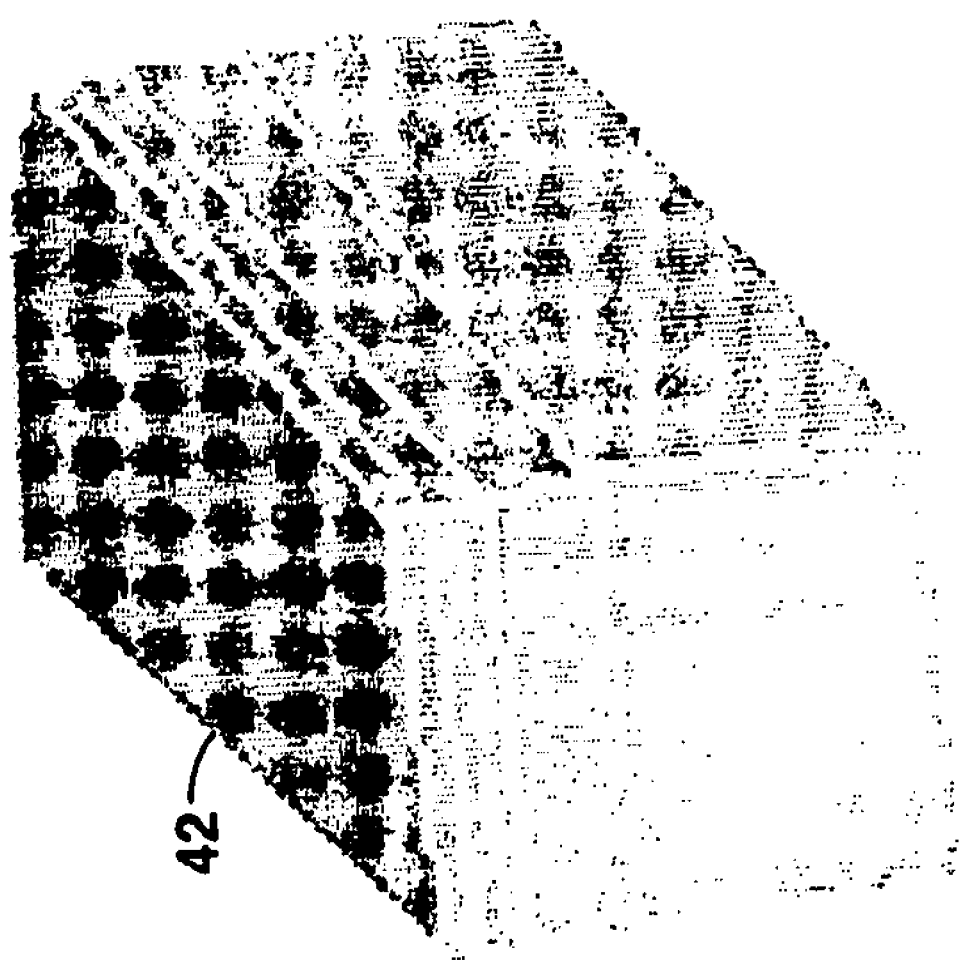
FIGS. 10-12 are depictions of the two reservoir compartment/fault system of FIG. 9 that are depicted at varying threshold constraints.
Figure 11:
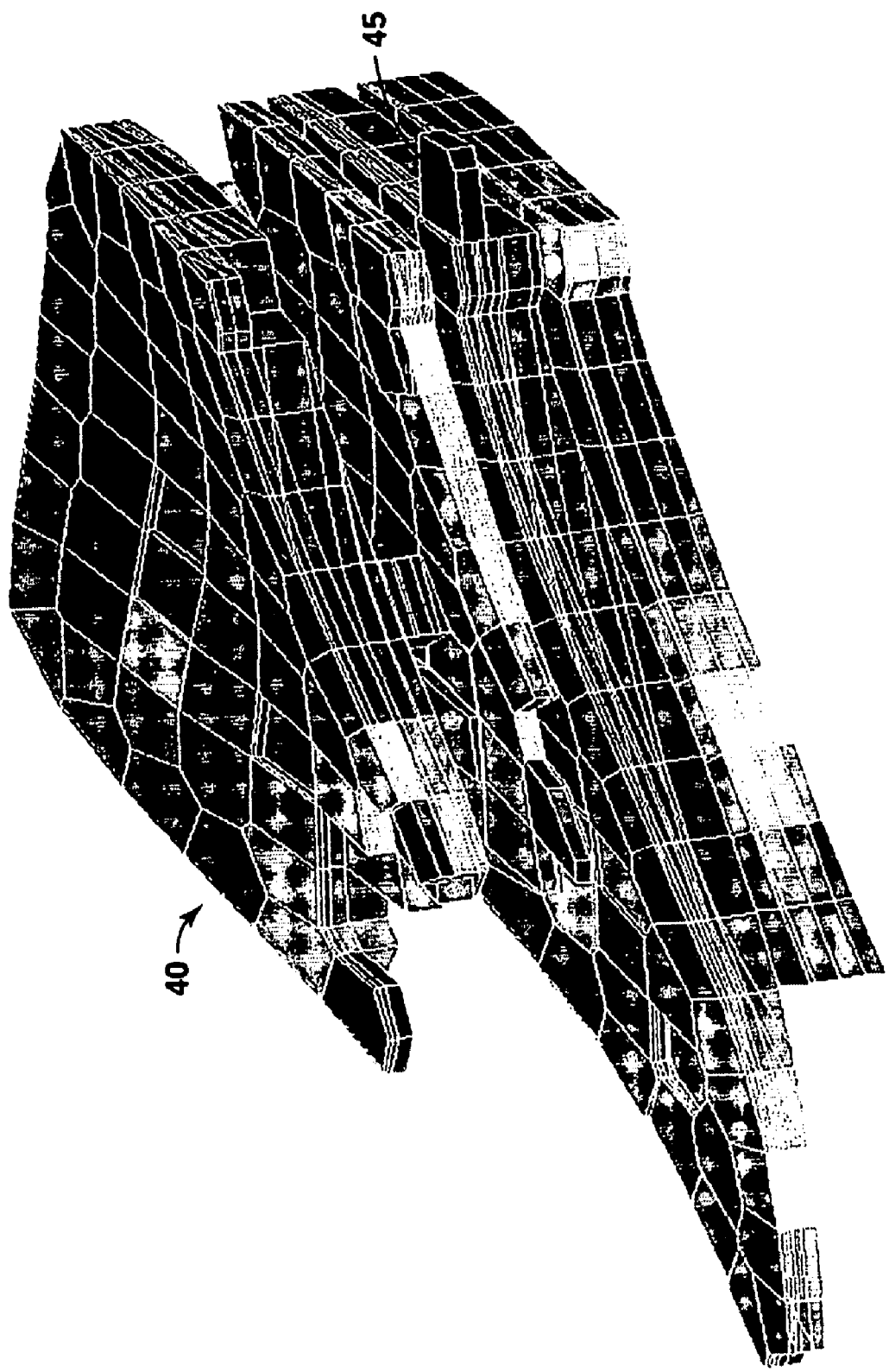
Figure 12:
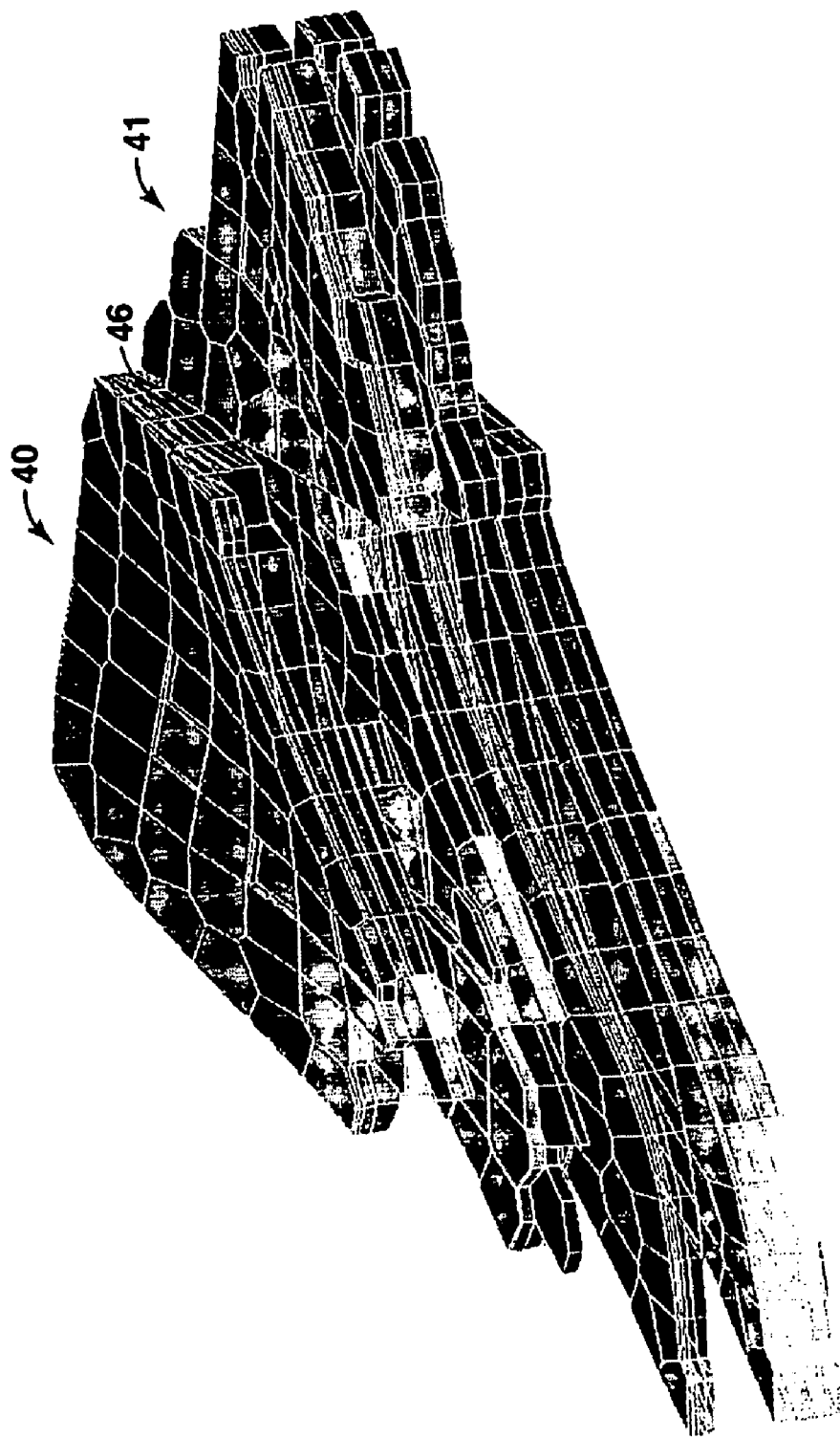

FIG. 9 depicts three segmented compartments 40, 41 and 43, which are separated by faults 46 and 47 on a 3-D viewer. A source vertex 42 in first compartment 40 is selected to serve as a source vertex in one method of leak detection and the SSSP algorithm is run for this source vertex 42. FIGS. 10, 11 and 12 depict 3-D viewer representations of all the vertices that are connected to the source vertex 42 at three successively higher threshold values for cost. In these figures cost is represented as the summed cost of the reciprocal of transmissibility. At a threshold value of 0.005 only four vertices are displayed in FIG. 10 and all such vertices are within the first compartment 40. At a threshold value of 0.24 the first vertex 45 in second compartment 41 is reached by an edge across fault 46 from the first compartment 40 as displayed in FIG. 11. Thus this method of leak detection has identified a potential model anomaly at the edge from first compartment 40, across fault 46, and into vertex 45 of the second compartment 41. FIG. 12 depicts the two compartment system at a threshold value of 0.40 and shows the magnitude of the model anomaly.

Another way to determine where best to impair or sever communication on a leak path is to display additional paths and then inspect the set of paths for commonality or overlap. This can be done by adding to the list of destination vertices in Compartment 2, yielding a display with multiple paths from the single source vertex in Compartment 1 to the selected destination vertices in Compartment 2. If there is a single (or "best") leak between the two compartments, the paths will overlay exactly in the source compartment (Compartment 1), and will diverge within the destination compartment (Compartment 2).

Typically the user would use the invention to find a leak, then use the 3D viewer's "Edit Property" tool to seal the leak by reducing the transmissibility of a selected edge on the leak path. This cycle of find-and-seal may have to be repeated (possibly many times, or perhaps not at all) to ensure the isolation of the two compartments, because it is unlikely that the original leakage resulted from a single edge.

The immediacy provided by the point-and-click interface and by the speed of computation makes the find-and-seal process very fast as compared with conducting repeated flow simulations. Embodiments of the invention make it possible to target edges for editing.

Example 2

Well Coupling

Users commonly want a quantitative assessment of the extent to which all possible pairs of wells communicate. Too much communication is generally undesirable. For injector-producer well pairs, too little communication may also be undesirable, because injected fluid will be ineffective at maintaining pressure near the producer. Injector-producer pairs that communicate too well result in early production of the injected fluid, which lowers the production of oil. Producer pairs that communicate too well compete with one another to produce oil that either could have produced alone.

Embodiments of the invention make it possible to identify and display the path of least resistance between every pair of wells. The path cost is a natural measure of coupling, i.e., the lower the cost, the higher the coupling.

The invention may be used to reveal in a quantitative and visual way the connectivity features that would otherwise be hidden. In particular, the distance between wells is often not a good measure of their coupling. That is, a well may be better connected to a remote well than to a closer well. This knowledge is useful for picking drilling locations and for adjusting grid properties to calibrate reservoir performance with historical data (history matching).

For a set of N wells, the number of well pairs is $N*(N-1)/2$. The corresponding shortest paths could be determined in $N-1$ SSSP calculations, each taking about one second. Since most reservoir models have a few tens of wells, the time required to determine shortest paths for all possible well pairs is not prohibitive.

The foregoing assumes that well-state considerations are ignored. Well state affects any shortest-path assessment because properties of edges between well-vertices and reservoir vertices are time-dependent, reflecting real conditions in the oilfield (i.e., reflecting the life cycle of real wells: drilling, completion, stimulations, workovers, and abandonment). More accurate assessment of well coupling may be accomplished where the SSSP calculations be repeated every time any well-state changes.

In practice, the user picks a particular time (date), the reservoir model knows all well-states at that time, and the invention evaluates shortest paths taking into account the current well-states.

The task of assessing well coupling for all well pairs (or a user-selected subset) is sufficiently common to warrant its own dialog (tool) in the shortest-paths interface. Capturing a file with the shortest paths for all well pairs is simple. Such a file not only captures path details (ordered list of vertices, edges, and cost along the path), but also condenses the detail into a single well-to-well cost for each well pair.

Displaying the entire collection of all-well-pairs shortest paths using the 3D viewer may be challenging when there are too many such paths. $N*(N-1)/2$ is a big number when N exceeds five. Moreover, there are multiple source vertices, and the paths may intersect. The number of paths displayed may be reduced so as to minimize visual overload. The number could be reduced by displaying only M nearest (measured by path-cost) neighbors, where M may be three or four. Another approach is to display only those well-pair paths with (total) cost below some threshold.

When there are multiple source vertices, and the paths may intersect, displaying any path-related property may lose information and be confusing. That is because where two or more paths overlay (i.e. share one or more vertices), the viewer can only display property-values for one of those paths. In practice, it is common that paths overlay, because connectivity tends to have an arterial structure. No such loss of information occurs when there is a single source and paths to multiple destinations overlap or when there are multiple sources and the user is displaying the results of a multi-source competition. Where the vertices and edges overlap, the path properties are identical, irrespective of the destination. Where there are multiple sources and the user is displaying the results of a multi-source competition, no two paths with different sources ever overlap (although two paths with the same source may overlap).

One use of the invention for understanding well-coupling is to capture the all-well-pairs shortest paths results in a file for analysis, and to display well-pair shortest paths one source-well at a time. This display strategy avoids the issues of too many paths and multi-source path overlap.

With this strategy, the user first launches the all-well-pairs shortest-paths task, then saves the file of results to serve as a guide as to which source-wells to visit for display purposes (e.g., those wells whose lowest-cost pairings have either very low cost or very high cost).

The user picks a well of interest to serve as the source vertex, then launches the SSSP calculation for that source. Then the user requests to display specific shortest paths by multi-selecting some or all other well-vertices as destinations, guided by the all-well-pairs results This display strategy avoids the ambiguity associated with displaying overlapping paths from multiple sources.

Example 3

Well Drainage Volumes

A multi-source competition in which the sources are all well-vertices assigns to each vertex an owner well-vertex. The multi-source competition in effect claims that all well-vertices act as producing wells with identical bottomhole pressures. The competition determines which well-vertices drain which reservoir vertices by assessing which well-vertex has the lowest-cost path to each reservoir vertex. Like any other task involving well vertices, this task may consider the time-dependent well state. A multi-source competition may use reservoir vertices as sources rather than well vertices.

The 3D viewer lets the user control various elements of the display. Different combinations of the settings expose different features of the grid's connectivity with respect to the sources (wells). Illustrative examples include the list of sources for which drainage volumes are to be displayed. This may be one, all, or a specific subset of the sources. Additionally, the 3D viewer lets the user control time, because well states depend on time. At the start of the model, there may be only a few wells, and these have large drainage volumes. As time advances and additional wells are drilled and completed, these new wells claim drainage volume from older wells. When a well is out of service, its drainage volume will likely be claimed by its active neighbors.

The 3D viewer lets the user control threshold (maximum value) on path cost (applies to all sources). If the user is displaying multiple sources, setting a low maximum-cost threshold yields some separation between adjacent drainage volumes. This makes it easier to understand the picture. If the user is displaying a single source, the maximum-cost can be nudged up from low values to high values to gain an appreciation for the shape of the drainage volume and to reveal obvious asymmetries.

In general there will be some vertices that are not connected to any of the selected, multiple sources. Such vertices may be identified as being owned by the source named "None," and if present in sufficient number and if they contain a sufficient amount of hydrocarbon, may represent a target for drilling. Commonly these vertices are few and poorly connected among themselves, because most current reservoir simulation grids have relatively high connectivity.

The drainage-volume view provided by the multi-source competition feature of embodiments of the invention yields a fast and information-rich view of the connectivity features of a reservoir simulation grid. The distinction between good wells and poor wells is readily apparent by comparing the size of their drainage volumes. The benefits of horizontal wells are evident from the size and shape of their drainage volumes. Oil that is difficult to drain from existing wells, hence represents a potential target for drilling and production, can be visualized by using the 3D viewer's threshold tool to display all vertices with cost higher than a user-specified value with all source vertices displayed.

In addition to their visual value, the multi-source competition results can be used analytically in at least the following ways. The multi-source competition results can be used in defining regions for averaging reservoir properties. Several situations arise in reservoir simulation in which it is necessary to identify the neighborhood (region) associated with each well. The region is needed to calculate average reservoir pressure, which may be used in history-matching to compare with field measurements of pressure in the well or used in prediction to control production and injection so as to conform to pressure guidelines. Current practice is to define well regions in an arbitrary (connectivity-blind) way, which is often at odds with the connectivity features revealed by the invention. The 3D-viewer interface could include a "Define Regions" dialog that would let the user mark sets of vertices as belonging to named regions based on those vertices in the view composed using a threshold on path-cost. These connectivity-based region definitions should be superior to regions that are defined without considering connectivity.

The multi-source competition results can be used in calculating hydrocarbon volume versus cost. The results of a multi-source competition can be analyzed to yield for each source a curve of cumulative amount of hydrocarbon (oil and gas) within a given cost (resistance to flow). This curve is built for one source vertex by sorting the vertices in its drainage volume from lowest to highest cost, determining the hydrocarbon contents of each vertex, and accumulating the contents over this sorted list. This curve conveys the accessibility of this source vertex (well) to hydrocarbon. A more favorable well has more hydrocarbons at lower cost than a less favorable well.

Volume-versus-cost curves derived from multi-source competition offer a fast, quantitative way to assess drilling locations because the curves measure both contents and connectivity, and because they show to what extent a new well would harm (take production from) nearby existing wells. When some embodiments of the invention is used to assess drilling locations, it is preferred to select the cost function that modifies the reciprocal of transmissibility using phase mobilities (saturations [hence, relative permeabilities] and viscosities) and the time of drilling.

Volume-versus-cost curves can also be used in history matching. Whenever it is necessary to adjust pore volume in the reservoir grid, transmissibilities should also be adjusted so as to preserve the original character evidenced in the volume-versus-cost curves. For example, if pore volume is significantly increased near a well, transmissibilities should be reduced. Otherwise, the volume-versus-cost curve may show an unnatural and exaggerated accessibility of the well to the added pore volume.

Example 4

Viewing Single-Source, All Paths

In embodiments of the invention, launching the SSSP algorithm for a single source vertex takes about one second to identify the shortest paths from that source vertex to all other vertices in the model. The simplest way to exploit this information is to pick one or more destination vertices and display the shortest paths from the single source vertex to the set of selected destination vertices. In this case (meaning, for a single source vertex), the multiple paths commonly overlay near the source and diverge to seek out the destinations. There is no loss of information if the paths overlay near the source.

Another approach to interpreting the connectivity with respect to a single source is to display all paths at once, using the 3D viewer's property-threshold tool to scan from destinations close to the source (low cost) toward destinations far from the source (high cost).

First, there is no need to select a set of destination vertices. Instead, the path-cost property is targeted for thresholding, the threshold minimum cost is set to zero (the source-vertex cost), and the maximum cost is set to a tiny value. Then the maximum value is nudged higher in small steps, at each step observing the shape of the growing collection of vertices.

Figure 13:
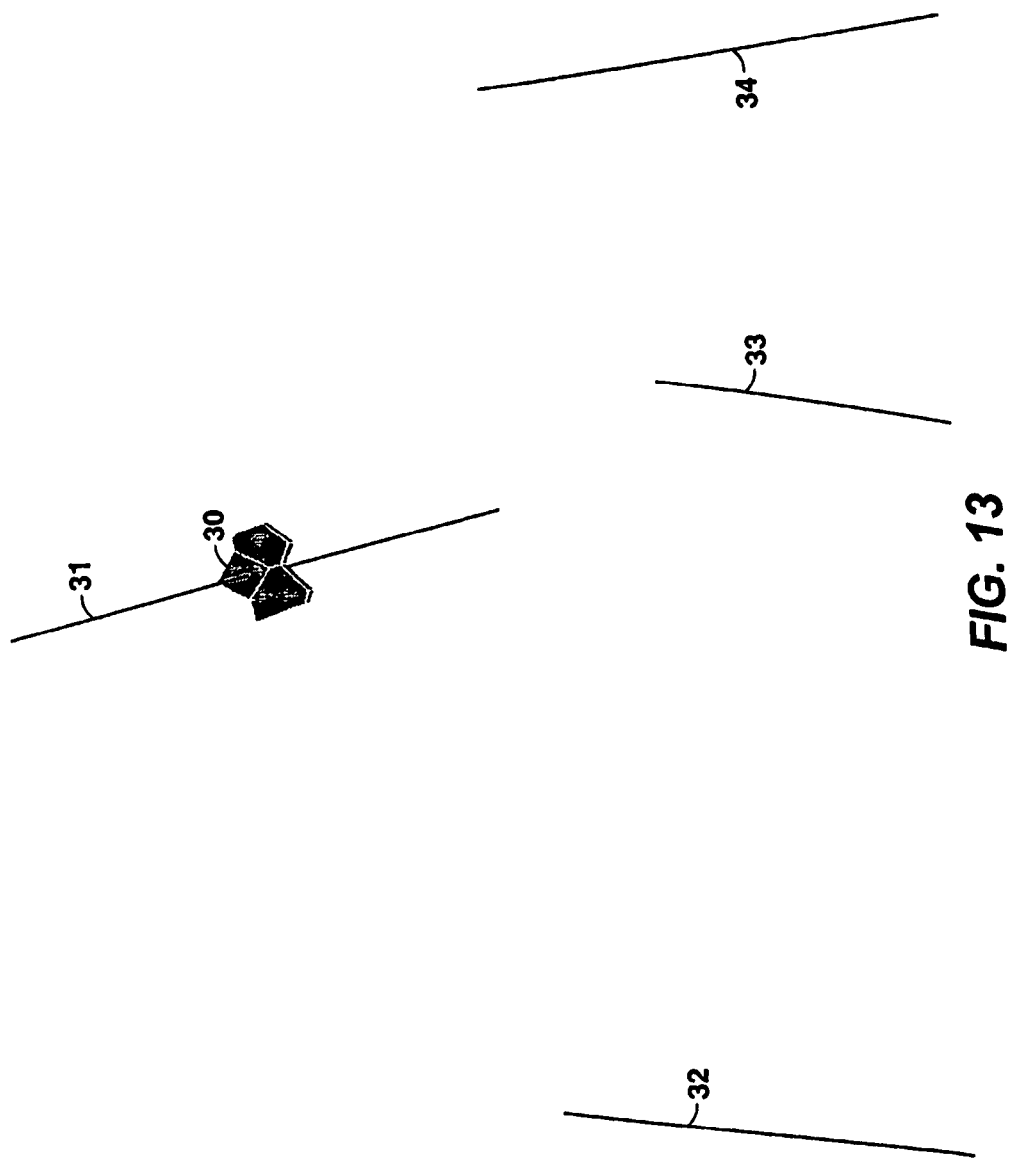
FIGS. 13-16 are depictions of a source vertex and destination vertices at successively higher threshold values.
Figure 14:
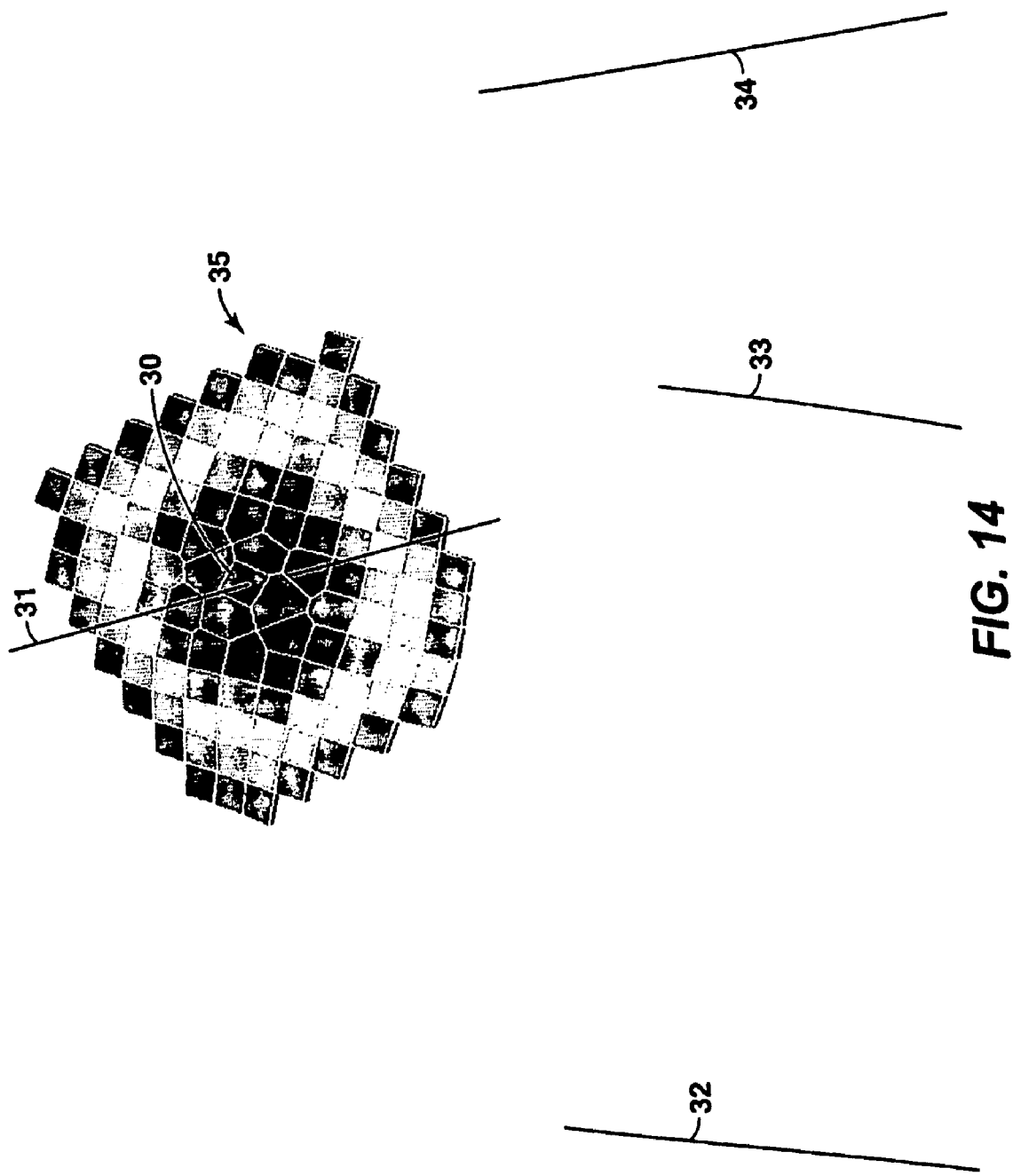
Figure 15:
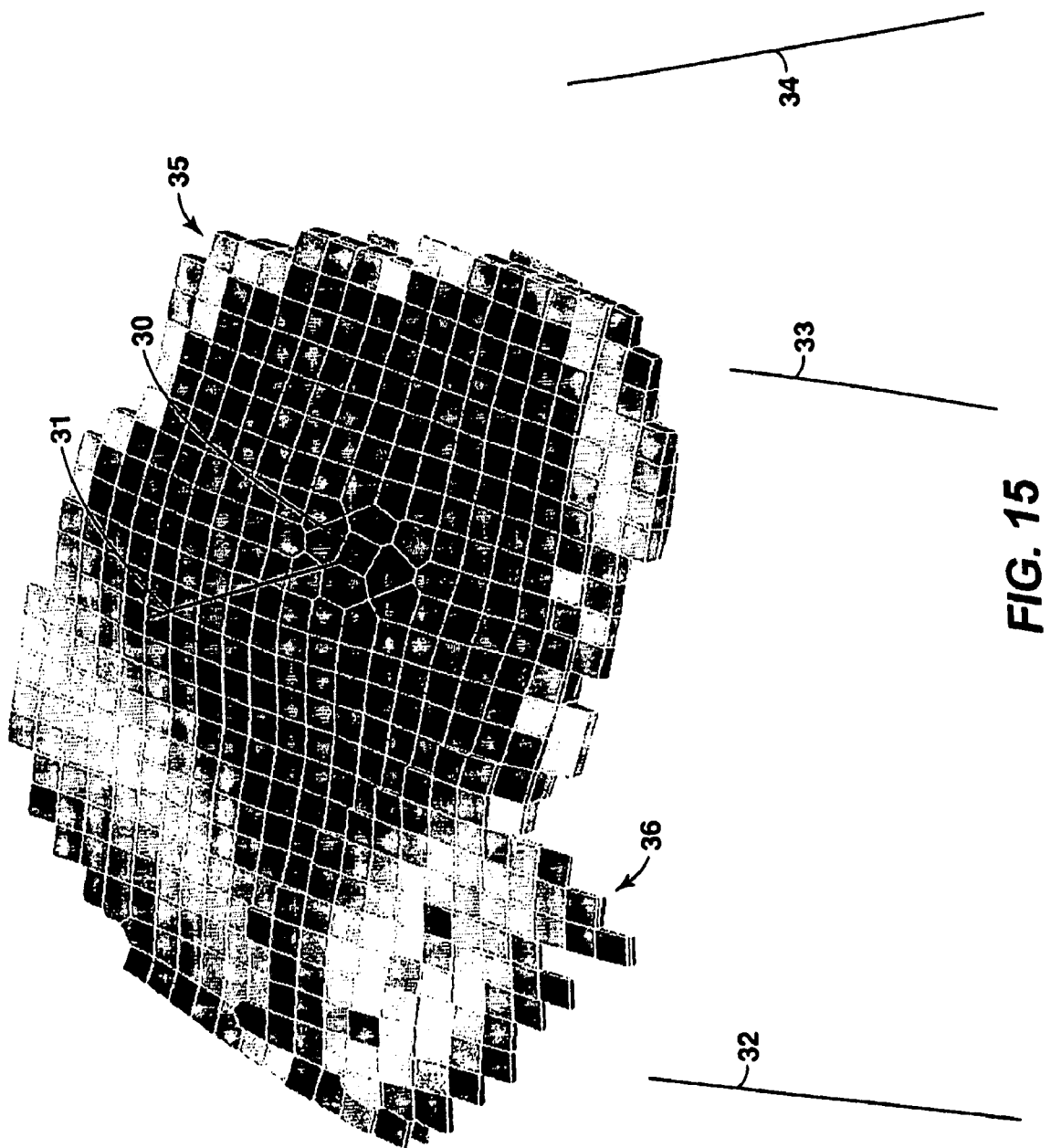
Figure 16:
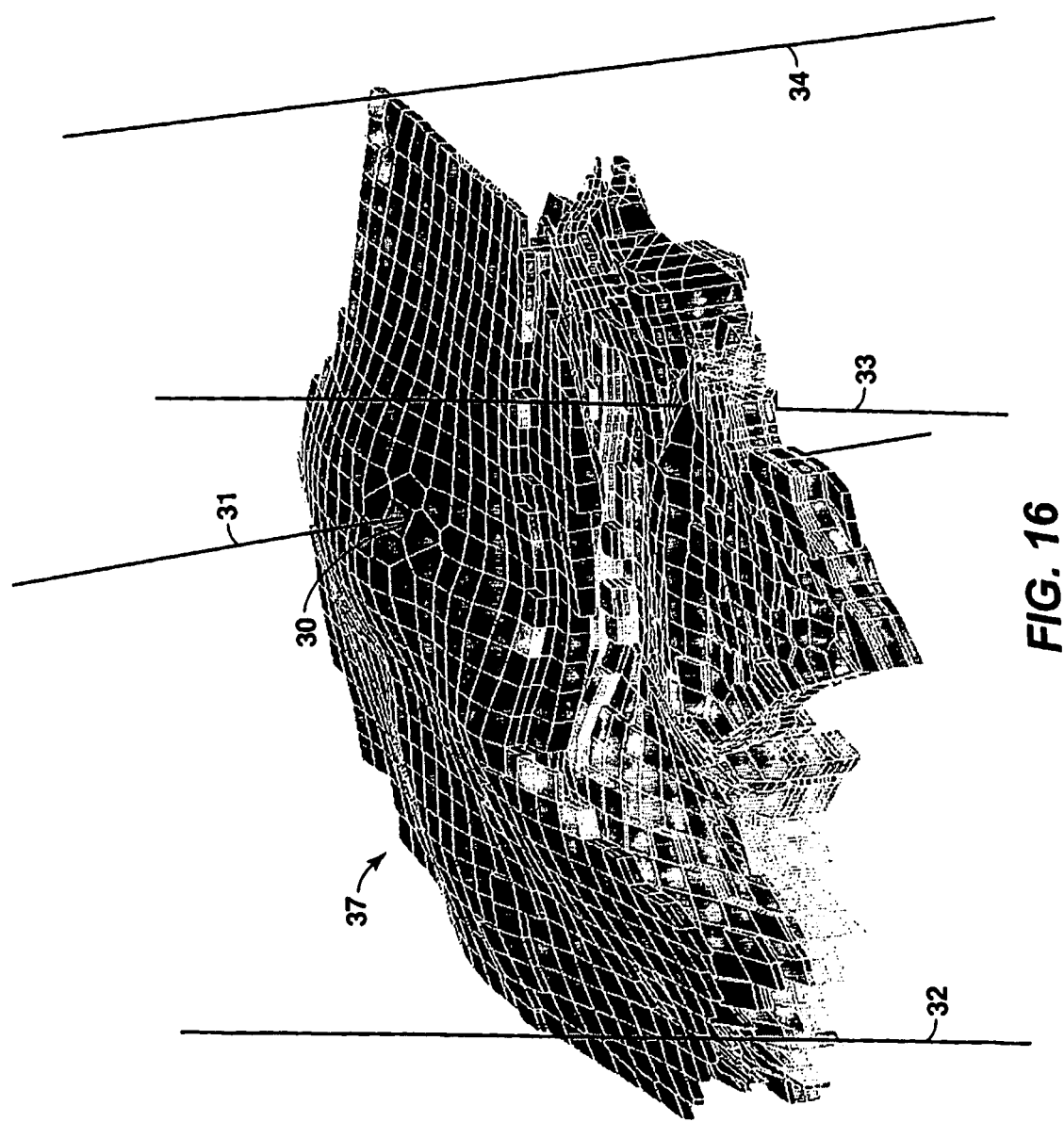
Figure 17:
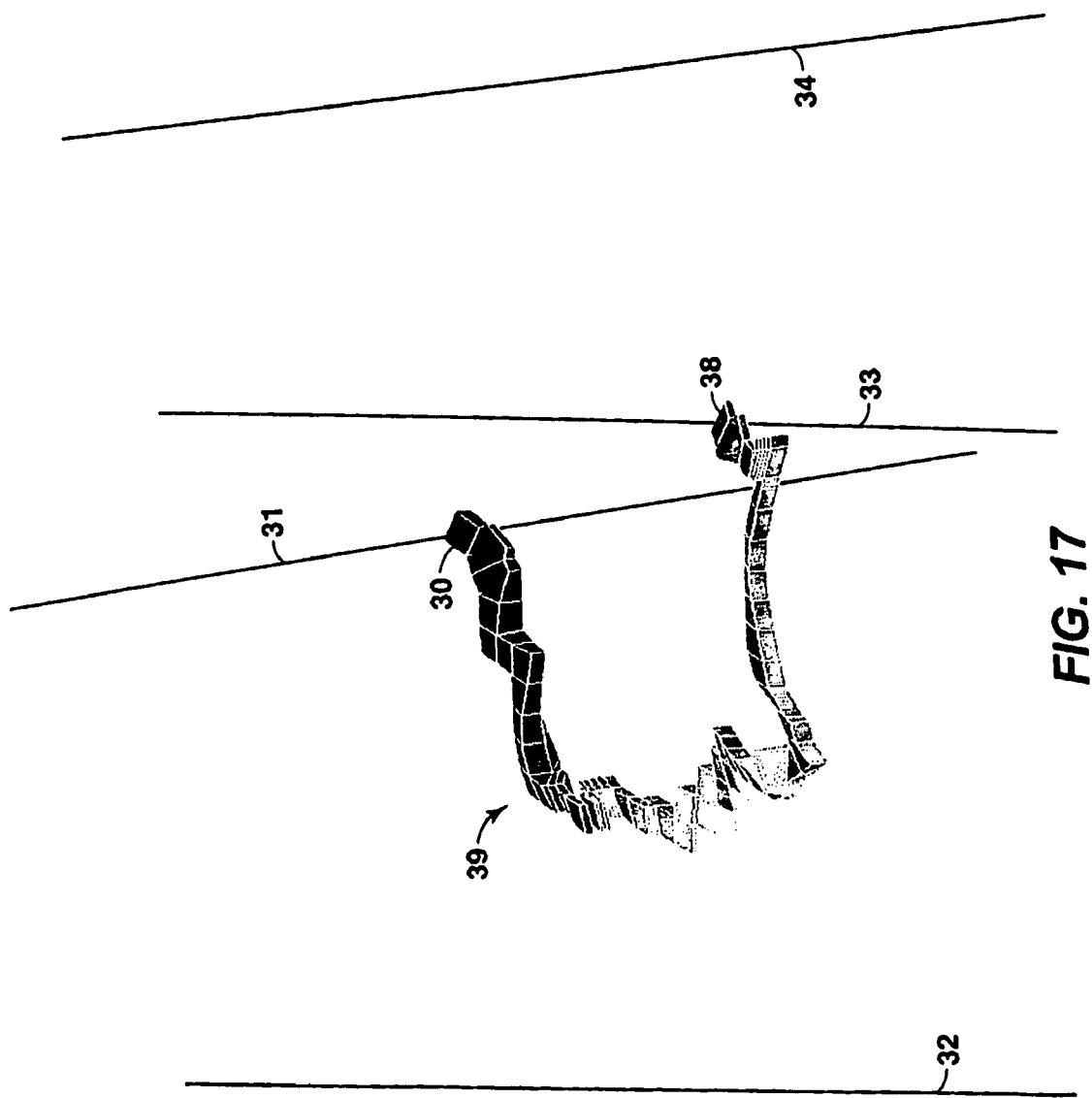
FIG. 17 is a depiction of a shortest path from one vertex in one lens to a second vertex in a second lens.

Referring now to FIGS. 13-17, the source vertex 30 is depicted with a producing well 31 and the succeeding figures are completed at successively increasing values of summed reciprocal of transmissibility as the threshold value. In FIG. 13 the threshold value is 0.05. The threshold value is increased in the succeeding figures as follows: FIG. 14, 0.20; FIG. 15, 0.60; FIG. 16, 2.60. In FIG. 14 the vertices that meet the threshold value form a nearly uniform circular lens 35. In FIG. 15 a second lens 36 begins to appear which indicates a path or chimney from the first lens 35 to the second lens 36. In FIG. 16 various lenses have been agglomerated to form an agglomerated mass of vertices 37. Additionally, the view in FIG. 16 has been tilted to more of a side view than the preceding figures. FIG. 17 was generated by selecting the shortest path from source vertex 30 contained in first lens 35 to destination vertex 38 contained in the lowermost lens of the agglomerated mass 37 and connected to producing well 33 (32 and 34 are other producing wells). The shortest path uncovers the highly conductive chimney 39 that serves as the path by which the respective lenses are connected. This chimney 39 is most likely an anomaly that can be corrected in the model.

The display could be interpreted as a "Medusa's head" of all shortest paths whose path-costs are confined within the current threshold. The advantage of seeing all paths is that shapes of the all-paths view often reveal important connectivity features.

Another interpretation of this all-paths viewing technique is that it mimics the injection at the source vertex of a colored resin using a syringe. The maximum path-cost (controlled by the threshold-tool settings) is like the injection pressure. At low injection pressures, the user sees where the resin infiltrates the model near the source vertex. As the pressure is slowly increased by squeezing the plunger on the syringe (nudging the maximum path-cost higher), the resin infiltrates an ever-larger volume of the reservoir grid, advancing along the paths of least resistance and revealing connectivity features.

If the reservoir properties were constant and isotropic (independent of direction), the all-paths view would present as a growing sphere (or cylinder of circular cross-section when confined between stratigraphic surfaces). But real reservoir grids generally present strikingly asymmetric (and informative) all-paths views. For example, if the source is on the edge of a sand body, the all-paths view would appear confined by the nearby bounding surfaces of the sand body but unconfined where the boundaries were distant.

In some cases, the view is so complex as to defy interpretation. Such cases may be better understood by displaying paths for a set of specific destinations or by using standard tools of the 3D viewer to slice the all-paths view.

A common observation is that the all-paths view grows by sharp steps in cost. That means the source is connected at low cost (low resistance to flow) to one compartment, but there is a jump in cost to access other compartments. Examining the details of this jump may reveal anomalous connectivity features (leaks that should be sealed) or may reveal intended features, such as low-transmissibility faults.

The implementation of the invention in the 3D viewer may provide a statistical-graph capability (the cumulative distribution function [CDF] of path-cost) that accommodates one or more single-source results. The CDF sorts the target property (path cost) from low to high values, and shows what proportion of all paths have a path-cost less than any particular value. Consequently, the CDF of path cost clearly reveals sharp increases in path-cost as steps in the otherwise smooth curve.

Example 5

Generating and Viewing a Set of Random, Specific Shortest Paths

A useful task to automate allows the user to generate and display in the 3D viewer a set of N randomly defined, independent, specific shortest paths. N may be any integer, but would normally be from ten to 100.

The motivation for offering a feature to generate and display N random, independent, shortest paths is provide to an automated, unbiased way to probe the connectivity of the reservoir simulation model.

In the absence of this feature, users naturally focus on well vertices. Although connectivity between wells is important, displaying random shortest paths serves to illuminate connectivity features in portions of the model that otherwise might escape attention. For example well vertices usually connect to reservoir vertices in the elevation interval that contains predominantly oil, so shortest-path investigations that use well vertices as source and destination usually fail to probe the deeper elevations that contain predominantly water and the shallower elevations that contain predominantly gas.

The user interface may be implemented in the 3D viewer, and it requests two input items from the user:
1. The number, N, of random paths to generate; and
2. Whether to display all N paths simultaneously or to segregate the paths into subsets such that within each subset, no paths intersect.

Other standard settings also influence the calculation, such as vertex and edge (pass-fail) criteria, whether or not to extend the reservoir grid to include well vertices, and if so, whether or not to permit crossflow through well vertices.

The N random, shortest paths are identified by 2N random draws without replacement from the set of vertices, which yields 2N unique vertices, i.e., no vertex appears twice in this list of 2N vertices. The first vertex is treated as a source vertex, and an SSSP calculation is launched for that source vertex. The second vertex is treated as a destination vertex for that source vertex, and the shortest path is identified for this source-destination pair. This process is repeated (N−1) times, consuming the 2N randomly drawn vertices and yielding N random, independent, shortest paths.

The resulting table of N source-destination vertex pairs may be viewed, and allows source (or destination) vertices of particular interest to be copied for re-use as source (or destination) vertices in other shortest-paths tools, such as displaying all shortest paths or multiple, specific paths for a source vertex.

In addition to the standard properties captured for each vertex and edge that belong to a path, these shortest paths will also have an integer identifier, which allows subsets of them to be displayed (and the others hidden) using the 3D viewer's threshold tool.

For N sufficiently large, there is a high probability that these paths will intersect and even have multiple vertices in common. Such overlaps are a potential source of confusion because the 3D viewer can display only a single value for each vertex property. Since overlapping vertices have different property-values for each path, information is lost for all but one of the paths where multiple paths overlap.

To preclude this kind of confusion, the user can choose to segregate the paths into subsets such that within each subset, no paths intersect. This segregation is implemented by an algorithm that identifies intersections between pairs of paths. Each candidate path visits each subset of non-intersecting paths and is tested for intersection with each resident path. Upon encountering the first intersection, the candidate path is said to fail this subset. The candidate path then exits the current subset and moves to the next, where the process is repeated. If the candidate path survives (passes) the intersection test with all paths resident in a subset, the candidate path is added to that subset. If the candidate path fails all current subsets, a new subset is created containing only the candidate path.

The present invention has been described in connection with its preferred embodiments. However, to the extent that the foregoing description was specific to a particular embodiment or a particular use of the invention, this was intended to be illustrative only and is not to be construed as limiting the scope of the invention. On the contrary, it was intended to cover all alternatives, modifications, and equivalents that are included within the spirit and scope of the invention, as defined by the appended claims.

All documents cited herein are fully incorporated by reference for all jurisdictions in which such incorporation is permitted and to the extent they are not inconsistent with this specification. Although some dependent claims have single dependencies in accordance with U.S. practice, each of the features in any of the dependent claims can be combined with each of the features of one or more of the other dependent claims dependent upon the same independent claim or claims. Certain features of the present invention are described in terms of a set of numerical upper limits and a set of numerical lower limits. It should be appreciated that ranges formed by any combination of these limits are within the scope of the invention unless otherwise indicated.

What is claimed is:

1. A method of evaluating the transmission of a property within a subsurface geologic reservoir to locate and operate a well to produce subsurface hydrocarbons from the subsurface geologic reservoir, comprising:
   i) characterizing connectivity in a reservoir model of the subsurface geologic reservoir by:
      a) providing a set of vertices representative of at least a portion of said reservoir, wherein said subsurface geologic reservoir contains a fluid and said property is a property of said fluid, said subsurface geologic reservoir, or a combination thereof;
      b) providing a plurality of edges, said edges representing property transmission paths between connected vertices within said set of vertices;
      c) associating with each edge a cost representative of the ability of said property to be transmitted across said edge from one vertex to another vertex within said set of vertices, wherein said cost is selected from a measure representative of resistance to fluid flow, or is selected from a value calculated from transmissibility, phase potential difference or phase mobility;
      d) selecting at least one source vertex from within said set of vertices, wherein said set of vertices includes reservoir vertices and well vertices; and
      e) determining an extremum path between said source vertex and each of at least two destination vertices that minimizes or maximizes a summed cost across the one or more edges included in said extremum path using a graph-theory single-source shortest-paths algorithm;
   ii) simulating the transmission of the property within the subsurface geologic reservoir, wherein simulating the transmission of the property includes displaying at least one of said extremum paths, at least one vertex, or at least one edge on a graphical device; and
   iii) locating and operating wells to produce subsurface hydrocarbons from the subsurface geologic reservoir based on the simulation of the transmission of the property.

2. A method according to claim 1, wherein said single-source shortest-paths algorithm is based upon Dijkstra's single-source shortest-paths algorithm.

3. A method according to claim 1, wherein said cost is the reciprocal of transmissibility.

4. A method according to claim 1, wherein said cost is the reciprocal of the product of transmissibility and phase mobility.

5. A method according to claim 2, wherein said step of providing a set of vertices includes providing a set of cells and translating said cells into vertices.

6. A method according to claim 5, wherein said step of providing a plurality of edges includes providing a plurality of connections and translating said connections into edges.

7. A method according to claim 6, wherein said steps of providing a set of vertices and providing a plurality of edges further includes discretizing a subsurface geologic reservoir into said cells and said connections.

8. A method according to claim 7, wherein said cells are part of a 3D geologic model.

9. A method according to claim 6, wherein said translating said connections into edges includes comparing said connections with a criterion and forming edges from only those connections which meet said criterion.

10. A method according to claim 1, wherein said graphical device comprises a 3D viewer.

11. A method according to claim 1, further including storing, for each vertex on said each extremum path, data representing the identity of the predecessor vertex or the predecessor edge on said extremum path.

12. A method according to claim 11, further including storing, for each vertex on each said extremum path, data representing the cost of predecessor edges connecting the source vertex to said each vertex on said extremum path.

13. A method according to claim 1, wherein said at least one source vertex includes a plurality of source vertices and further including iterating steps (d) and (e) for each of said plurality of source vertices to determine a plurality of collections of source vertex extrema paths for each said source vertex to a plurality of destination vertices.

14. A method according to claim 13, wherein said plurality of source vertices includes well vertices.

15. A method according to claim 14, further comprising selecting at least one reservoir vertex that is a destination vertex and determining the set of extrema paths from each source well vertex to said destination reservoir vertex.

16. A method according to claim 15, further comprising determining the most extreme extremum path of said set of extrema paths.

17. A method according to claim 14, further comprising selecting a first source well vertex from said plurality of source vertices and a second well vertex and determining the extremum path from said first source well vertex to said second well vertex.

18. A method according to claim 1, further including selecting an extremum path cost criterion, and determining a first destination vertex group comprising all destination vertices that are connected to said source vertex by extrema paths that meet said extremum path cost criterion.

19. A method according to claim 18, further including associating with each destination vertex within said first destination vertex group a value representative of the amount of a fluid contained within each said destination vertex and summing the total amount of fluid contained in said first destination vertex group.

20. A method according to claim 13, wherein said plurality of source vertices include vertices selected randomly and further including randomly selecting extrema paths from each of said randomly selected source vertices and displaying said randomly selected extrema paths on a 3D viewer.

21. A method according to claim 13, wherein said plurality of collections of source vertex extrema paths contains at least two different extrema paths that have at least one common vertex and further comprising segregating the extrema paths from said plurality of collections of source vertex extrema paths into two or more groups, each of said groups comprising only paths that have no common vertices.

22. A method according to claim 1, further including:
(f) sorting said plurality of source vertex extrema paths according to said paths' relative summed costs; and
(g) creating a display of said plurality of source vertex extrema paths' sorted relative summed costs.

23. A method according to claim 22, further including calculating the sample cumulative distribution function of path cost for said plurality of source vertex extrema paths and wherein said creating step (g) includes creating a display of said sample cumulative distribution function.

24. A method according to claim 2, wherein said single-source, shortest-paths algorithm contains a priority queue, implemented using a recursive formulation.

25. A method according to claim 2, wherein said single-source, shortest-paths algorithm contains a priority queue, implemented using an iterative formulation.

26. A method according to claim 1, wherein said method is completed using a computer.

27. A computer-readable media embodying instructions for performing a method, that when executed by a computer, evaluates the transmission of a property within a subsurface geologic reservoir, said method comprising the following steps;
a) reading a set of vertices representative of at least a portion of said reservoir, wherein the subsurface geologic reservoir contains a fluid and the property is a property of the fluid, the subsurface geologic reservoir, or a combination thereof;
b) reading a plurality of edges, said edges representing property transmission paths between connected vertices within said set of vertices;
c) associating with each edge a cost representative of the ability of said property to be transmitted across said edge from one vertex to another vertex within said set of vertices, wherein the cost is selected from a measure representative of resistance to fluid flow, or is selected from a value calculated from transmissibility, phase potential difference and phase mobility;
d) reading a first vertex from within said set of vertices;
e) determining an extremum path between said first vertex and each of at least two other vertices that minimizes or maximizes the summed cost across the one or more edges included in said extremum path using a graph-theory single-source shortest-paths algorithm; and
(f) displaying at least one of the extremum paths, at least one vertex, or at least one edge on a graphical device.

28. The computer-readable media of claim 27 wherein said single-source shortest-paths algorithm is based upon Dijkstra's single-source shortest-paths algorithm.

29. The computer-readable media of claim 27 wherein said graphical device comprises a 3D viewer.

30. The computer-readable media of claim 27 wherein said set of vertices includes reservoir vertices and well vertices.

31. The computer-readable media of claim 27 wherein said method further comprises the following steps:
(f) sorting said plurality of source vertex extrema paths according to said paths' relative summed costs; and
(g) creating a display of said plurality of source vertex extrema paths' sorted relative summed costs.

32. The computer-readable media of claim 27 wherein said single-source, shortest-paths algorithm contains a priority queue, implemented using a recursive formulation.

* * * * *